US012756826B2

(12) United States Patent
Rosewarne et al.

(10) Patent No.: US 12,756,826 B2
(45) Date of Patent: *Oct. 6, 2026

(54) METHOD, APPARATUS AND SYSTEM FOR ENCODING AND DECODING A TRANSFORMED BLOCK OF VIDEO SAMPLES

(71) Applicant: CANON KABUSHIKI KAISHA, Tokyo (JP)

(72) Inventors: Christopher James Rosewarne, Concord West (AU); Andrew James Dorrell, Glenbrook (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/935,302

(22) Filed: Nov. 1, 2024

(65) Prior Publication Data

US 2025/0063169 A1 Feb. 20, 2025

Related U.S. Application Data

(63) Continuation of application No. 17/268,062, filed as application No. PCT/AU2019/050654 on Jun. 25, 2019, now Pat. No. 12,177,430.

(30) Foreign Application Priority Data

Aug. 17, 2018 (AU) ................................ 2018217333

(51) Int. Cl.
*H04N 19/119* (2014.01)
*H04N 19/169* (2014.01)
(Continued)

(52) U.S. Cl.
CPC ....... *H04N 19/119* (2014.11); *H04N 19/1883* (2014.11); *H04N 19/46* (2014.11); *H04N 19/96* (2014.11)

(58) Field of Classification Search
None
See application file for complete search history.

(56) References Cited

U.S. PATENT DOCUMENTS 12,155,870 B2 * 11/2024 Rosewarne .......... H04N 19/132
12,177,430 B2 * 12/2024 Rosewarne .......... H04N 19/157
(Continued)

*Primary Examiner* — Kaitlin A Retallick
(74) *Attorney, Agent, or Firm* — Canon U.S.A., Inc. IP Division

(57) ABSTRACT

A system and method of decoding a coding unit in an image frame from a bitstream. The method comprises determining a size of the coding unit from the bitstream; and dividing the image frame into a plurality of equally sized processing regions, each of the equally sized processing regions being a block processed during a single stage of a pipeline decoding the bitstream. If the coding unit overlaps a boundary between the determined processing regions, the method comprises selecting a transform size for the coding unit from a plurality of transform sizes, the transform size being selected to fit within the coding unit and being different in size to the processing regions; and decoding the coding unit by applying an inverse transform to residual coefficients of each transform unit in the coding unit, each of the transform units being of the selected transform size.

8 Claims, 17 Drawing Sheets

(51) Int. Cl.
*H04N 19/46* (2014.01)
*H04N 19/96* (2014.01)

(56) References Cited

U.S. PATENT DOCUMENTS

| | | | | |
|---|---|---|---|---|
| 2013/0315312 | A1* | 11/2013 | Amano | H04N 19/61<br>375/240.16 |
| 2019/0075328 | A1* | 3/2019 | Huang | H04N 19/70 |
| 2020/0045308 | A1* | 2/2020 | Panusopone | H04N 19/176 |
| 2021/0037237 | A1* | 2/2021 | Hsiang | H04N 19/70 |
| 2021/0092394 | A1* | 3/2021 | Tsai | H04N 19/172 |
| 2023/0370648 | A1* | 11/2023 | Nam | H04N 19/96 |

* cited by examiner

METHOD, APPARATUS AND SYSTEM FOR ENCODING AND DECODING A TRANSFORMED BLOCK OF VIDEO SAMPLES

CROSS-REFERENCE TO RELATED APPLICATIONS

This application is the continuation of U.S. application Ser. No. 17/268,062, filed on Feb. 11, 2021, which is the National Phase application of PCT Application No. PCT/AU2019/050654, filed on Jun. 25, 2019 and titled "METHOD, APPARATUS AND SYSTEM FOR ENCODING AND DECODING A TRANSFORMED BLOCK OF VIDEO SAMPLES". This application claims the benefit under 35 U.S.C. § 119 (a)-(d) of Australian Patent Application No. 2018217333, filed on Aug. 17, 2018. The above cited patent applications are incorporated by reference herein in their entireties.

TECHNICAL FIELD

The present invention relates generally to digital video signal processing and, in particular, to a method, apparatus and system for encoding and decoding a transformed block of video samples. The present invention also relates to a computer program product including a computer readable medium having recorded thereon a computer program for encoding and decoding a transformed block of video samples.

BACKGROUND

Many applications for video coding currently exist, including applications for transmission and storage of video data. Many video coding standards have also been developed and others are currently in development. Recent developments in video coding standardisation have led to the formation of a group called the "Joint Video Experts Team" (JVET). The Joint Video Experts Team (JVET) includes members of Study Group 16, Question 6 (SG16/Q6) of the Telecommunication Standardisation Sector (ITU-T) of the International Telecommunication Union (ITU), also known as the "Video Coding Experts Group" (VCEG), and members of the International Organisations for Standardisation/International Electrotechnical Commission Joint Technical Committee 1/Subcommittee 29/Working Group 11 (ISO/IEC JTC1/SC29/WG11), also known as the "Moving Picture Experts Group" (MPEG).

The Joint Video Experts Team (JVET) issued a Call for Proposals (CfP), with responses analysed at its $10^{th}$ meeting in San Diego, USA. The submitted responses demonstrated video compression capability significantly outperforming that of the current state-of-the-art video compression standard, i.e.: "high efficiency video coding" (HEVC). On the basis of this outperformance it was decided to commence a project to develop a new video compression standard, to be named 'versatile video coding' (VVC). VVC is anticipated to address ongoing demand for ever-higher compression performance, especially as video formats increase in capability (e.g., with higher resolution and higher frame rate) and address increasing market demand for service delivery over WANs, where bandwidth costs are relatively high. At the same time, VVC must be implementable in contemporary silicon processes and offer an acceptable trade-off between the achieved performance versus the implementation cost (for example, in terms of silicon area, CPU processor load, memory utilisation and bandwidth).

Video data includes a sequence of frames of image data, each of which include one or more colour channels. Generally one primary colour channel and two secondary colour channels are needed. The primary colour channel is generally referred to as the 'luma' channel and the secondary colour channel(s) are generally referred to as the 'chroma' channels. Although video data is typically displayed in an RGB (red-green-blue) colour space, this colour space has a high degree of correlation between the three respective components. The video data representation seen by an encoder or a decoder is often using a colour space such as YCbCr. YCbCr concentrates luminance, mapped to 'luma' according to a transfer function, in a Y (primary) channel and chroma in Cb and Cr (secondary) channels. Moreover, the Cb and Cr channels may be sampled spatially at a lower rate compared to the luma channel, for example half horizontally and half vertically-known as a '4:2:0 chroma format'.

The VVC standard is a 'block based' codec, in which frames are firstly divided into a square array of regions known as 'coding tree units' (CTUs). CTUs generally occupy a relatively large area, such as 128×128 luma samples. However, CTUs at the right and bottom edge of each frame may be smaller in area. Associated with each CTU is a 'coding tree' that defines a decomposition of the area of the CTU into a set of areas, also referred to as 'coding units' (CUs). The CUs are processed for encoding or decoding in a particular order. As a consequence of the coding tree and the use of the 4:2:0 chroma format, a given area in the frame is associated with a collection of collocated blocks across the colour channels. The luma block has a dimension of width×height and the chroma blocks have dimensions of width/2×height/2 for each chroma block. The collections of collocated blocks for a given area are generally referred to as 'units', for example the above-mentioned CUs, as well as 'prediction units' (PUs), and 'transform units' (TUs).

Notwithstanding the different dimensions of chroma blocks versus luma blocks for the same area, the size of a given 'unit' is generally described in terms of the dimensions of the luma block for the unit. Individual blocks are typically identified by the type of unit for which the blocks are associated. For example, 'coding block' (CB), 'transform block' (TB)', and prediction block (PB) are blocks for one colour channel and are associated with CU, TU, and PU, respectively. Notwithstanding the above distinction between 'units' and 'blocks', the term 'block' may be used as a general term for areas or regions of a frame for which operations are applied to all colour channels.

For each CU a prediction (PU) of the contents (sample values) of the corresponding area of frame data is generated (a 'prediction unit'). Further, a representation of the difference (or 'residual' in the spatial domain) between the prediction and the contents of the area as seen at input to the encoder is formed. The difference in each colour channel may be transformed coded as a sequence of residual coefficients, forming one or more TUs for a given CU. The applied transform may be a Discrete Cosine Transform (DCT) or other transform, applied to each block of residual values. This primary transform is applied separably, i.e. that is the two dimensional transform is performed in two passes. The block is firstly transformed by applying a one-dimensional transform to each row of samples in the block. Then, the partial result is transformed by applying a one-dimensional transform to each column of the partial result to produce a final block of transform coefficients that substantially decorrelates the residual samples. Transforms of various sizes are supported by the VVC standard, including transforms of rectangular-shaped blocks, with each side dimension being a power of two. Transform coefficients are quantised for entropy encoding into a bitstream.

Implementations of the VVC standard typically use pipelining to divide the processing into a sequence of stages. Each stage operates concurrently and partially processed blocks are passed from one stage to the next, before fully processed (i.e. encoded or decoded) blocks are output. Efficient handling of transformed blocks in the context of pipelined architectures is needed to avoid excessive implementation cost for the VVC standard. Excessive implementation cost is needed both with respect to memory consumption and with respect to functional modules required to process a 'worst case' both in terms of the rate at which pipeline stages need to complete and the size of data processed at each stage.

SUMMARY

It is an object of the present invention to substantially overcome, or at least ameliorate, one or more disadvantages of existing arrangements.

According to one aspect of the present disclosure, there is provided a method of decoding a coding unit in an image frame from a bitstream, the method comprising:

- determining a size of the coding unit from the bitstream;
- dividing the image frame into a plurality of equally sized processing regions, each of the equally sized processing regions being a block processed during a single stage of a pipeline decoding the bitstream;
- if the coding unit overlaps a boundary between the determined processing regions, selecting a transform size for the coding unit from a plurality of transform sizes, the transform size being selected to fit within the coding unit and being different in size to the processing regions; and
- decoding the coding unit by applying an inverse transform to residual coefficients of each transform unit in the coding unit, each of the transform units being of the selected transform size.

According to another aspect of the present disclosure, there is provided a non-transitory computer readable medium having a computer program stored thereon to implement a method of decoding a coding unit in an image frame from a bitstream, the program comprising:

- code for determining a size of the coding unit from the bitstream;
- code for dividing the image frame into a plurality of equally sized processing regions, each of the equally sized processing regions being a block processed during a single stage of a pipeline decoding the bitstream;
- code for, if the coding unit overlaps a boundary between the determined processing regions, selecting a transform size for the coding unit from a plurality of transform sizes, the transform size being selected to fit within the coding unit and being different in size to the processing regions; and
- code for decoding the coding unit by applying an inverse transform to residual coefficients of each transform unit in the coding unit, each of the transform units being of the selected transform size.

According to still another aspect of the present disclosure, there is provided a system, comprising:

- a memory; and
- a processor, wherein the processor is configured to execute code stored on the memory for implementing a method of decoding a coding unit in an image frame from a bitstream, the method comprising:
  - determining a size of the coding unit from the bitstream;
  - dividing the image frame into a plurality of equally sized processing regions, each of the equally sized processing regions being a block processed during a single stage of a pipeline decoding the bitstream;
  - if the coding unit overlaps a boundary between the determined processing regions, selecting a transform size for the coding unit from a plurality of transform sizes, the transform size being selected to fit within the coding unit and being different in size to the processing regions; and
  - decoding the coding unit by applying an inverse transform to residual coefficients of each transform unit in the coding unit, each of the transform units being of the selected transform size.

According to still another aspect of the present disclosure, there is provided a video decoder, configured to:

- receive an image frame from a bitstream;
- determine a size of a coding unit in the bitstream;
- divide the image frame into a plurality of equally sized processing regions, each of the equally sized processing regions being a block processed during a single stage of a pipeline decoding the bitstream;
- if the coding unit overlaps a boundary between the determined processing regions, select a transform size for the coding unit from a plurality of transform sizes, the transform size being selected to fit within the coding unit and being different in size to the processing regions; and
- decode the coding unit by applying an inverse transform to residual coefficients of each transform unit in the coding unit, each of the transform units being of the selected transform size.

According to still another aspect of the present disclosure, there is provided a method of decoding a coding unit in an image frame from a bitstream, the method comprising:

- determining a size of the coding unit from the bitstream;
- dividing the image frame into a plurality of equally sized processing regions, each of the equally sized processing regions being smaller than a largest available coding unit size;
- selecting a motion vector corresponding to the coding unit from a list of candidate motion vectors, selecting the motion vector comprising (i) decoding a merge index if the coding unit is greater than or equal to a size than one of the determined processing regions, or (ii) decoding a skip flag to decode that the merge index if the coding unit is not greater than or equal to the size than one of the determined processing regions; and
- decoding the coding unit according to the selected motion vector for the coding unit.

According to still another aspect of the present disclosure, there is provided a non-transitory computer readable medium having a computer program stored thereon to implement a method of decoding a coding unit in an image frame from a bitstream, the program comprising:

- code for determining a size of the coding unit from the bitstream;

code for dividing the image frame into a plurality of equally sized processing regions, each of the equally sized processing regions being smaller than a largest available coding unit size;

code for selecting a motion vector corresponding to the coding unit from a list of candidate motion vectors, selecting the motion vector comprising (i) decoding a merge index if the coding unit is greater than or equal to a size than one of the determined processing regions, or (ii) decoding a skip flag to decode that the merge index if the coding unit is not greater than or equal to the size than one of the determined processing regions; and code for decoding the coding unit according to the selected motion vector for the coding unit.

According to still another aspect of the present disclosure, there is provided a system, comprising:

a memory; and a processor, wherein the processor is configured to execute code stored on the memory for implementing a method of decoding a coding unit in an image frame from a bitstream, the method comprising:

determining a size of the coding unit from the bitstream;

dividing the image frame into a plurality of equally sized processing regions, each of the equally sized processing regions being smaller than a largest available coding unit size;

selecting a motion vector corresponding to the coding unit from a list of candidate motion vectors, selecting the motion vector comprising (i) decoding a merge index if the coding unit is greater than or equal to a size than one of the determined processing regions, or (ii) decoding a skip flag to decode that the merge index if the coding unit is not greater than or equal to the size than one of the determined processing regions; and decoding the coding unit according to the selected motion vector for the coding unit.

According to still another aspect of the present disclosure, there is provided a video decoder, configured to:

receive an image frame from a bitstream;

determine a size of a coding unit from the bitstream;

divide the image frame into a plurality of equally sized processing regions, each of the equally sized processing regions being smaller than a largest available coding unit size;

select a motion vector corresponding to the coding unit from a list of candidate motion vectors, selecting the motion vector comprising (i) decoding a merge index if the coding unit is greater than or equal to a size than one of the determined processing regions, or (ii) decoding a skip flag to decode that the merge index if the coding unit is not greater than or equal to the size than one of the determined processing regions; and decode the coding unit according to the selected motion vector for the coding unit.

Other aspects are also disclosed.

BRIEF DESCRIPTION OF THE DRAWINGS

At least one embodiment of the present invention will now be described with reference to the following drawings and appendices, in which.

DETAILED DESCRIPTION INCLUDING BEST MODE

Figure 1:
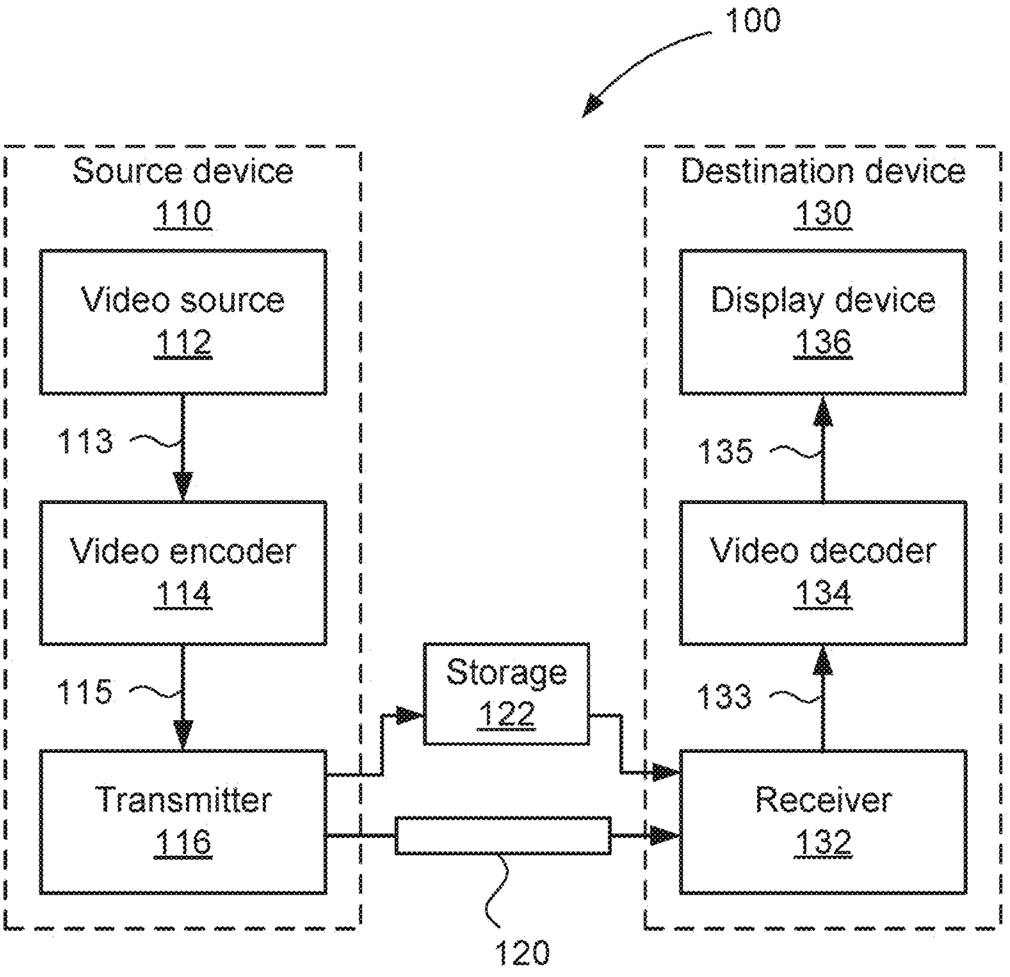
FIG. 1 is a schematic block diagram showing a video encoding and decoding system.

Where reference is made in any one or more of the accompanying drawings to steps and/or features, which have the same reference numerals, those steps and/or features have for the purposes of this description the same function(s) or operation(s), unless the contrary intention appears.

FIG. 1 is a schematic block diagram showing functional modules of a video encoding and decoding system 100. The system 100 may utilise implicit division of large blocks or coding units (CUs) into multiple, smaller, blocks or transform units (TUs) to enable processing the coding tree unit (CTU) in regions (or 'pipeline processing regions') smaller than the CTU size. For example, the system 100 may process the CTU as four quadrants, each of which may contain many CUs and/or may contain parts of CUs that span across multiple regions.

The system 100 includes a source device 110 and a destination device 130. A communication channel 120 is used to communicate encoded video information from the source device 110 to the destination device 130. In some arrangements, the source device 110 and destination device 130 may either or both comprise respective mobile telephone handsets or "smartphones", in which case the communication channel 120 is a wireless channel. In other arrangements, the source device 110 and destination device 130 may comprise video conferencing equipment, in which case the communication channel 120 is typically a wired channel, such as an internet connection. Moreover, the source device 110 and the destination device 130 may comprise any of a wide range of devices, including devices supporting over-the-air television broadcasts, cable television applications, internet video applications (including streaming) and applications where encoded video data is captured on some computer-readable storage medium, such as hard disk drives in a file server.

As shown in FIG. 1, the source device 110 includes a video source 112, a video encoder 114 and a transmitter 116. The video source 112 typically comprises a source of captured video frame data (shown as 113), such as an image capture sensor, a previously captured video sequence stored on a non-transitory recording medium, or a video feed from a remote image capture sensor. The video source 112 may also be an output of a computer graphics card, for example displaying the video output of an operating system and various applications executing upon a computing device, for example a tablet computer. Examples of source devices 110 that may include an image capture sensor as the video source 112 include smart-phones, video camcorders, professional video cameras, and network video cameras.

Figure 3:
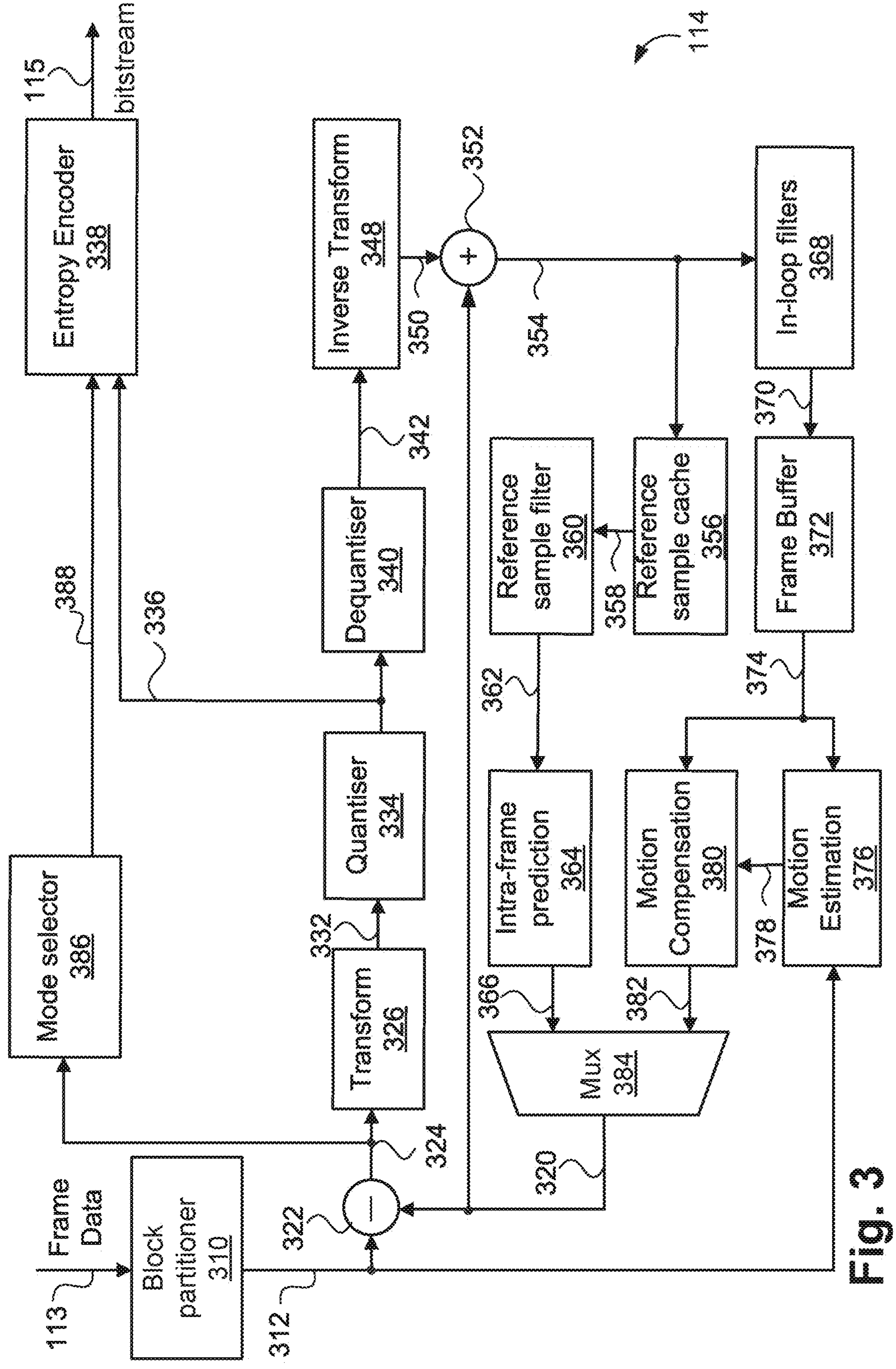
FIG. 3 is a schematic block diagram showing functional modules of a video encoder.

The video encoder 114 converts (or 'encodes') the captured frame data (indicated by an arrow 113) from the video source 112 into a bitstream (indicated by an arrow 115) as described further with reference to FIG. 3. The bitstream 115 is transmitted by the transmitter 116 over the communication channel 120 as encoded video data (or "encoded video information"). It is also possible for the bitstream 115 to be stored in a non-transitory storage device 122, such as a "Flash" memory or a hard disk drive, until later being transmitted over the communication channel 120, or in-lieu of transmission over the communication channel 120.

The destination device 130 includes a receiver 132, a video decoder 134 and a display device 136. The receiver 132 receives encoded video data from the communication channel 120 and passes received video data to the video decoder 134 as a bitstream (indicated by an arrow 133). The video decoder 134 then outputs decoded frame data (indicated by an arrow 135) to the display device 136. Examples of the display device 136 include a cathode ray tube, a liquid crystal display, such as in smart-phones, tablet computers, computer monitors or in stand-alone television sets. It is also possible for the functionality of each of the source device 110 and the destination device 130 to be embodied in a single device, examples of which include mobile telephone handsets and tablet computers.

Figure 2A:
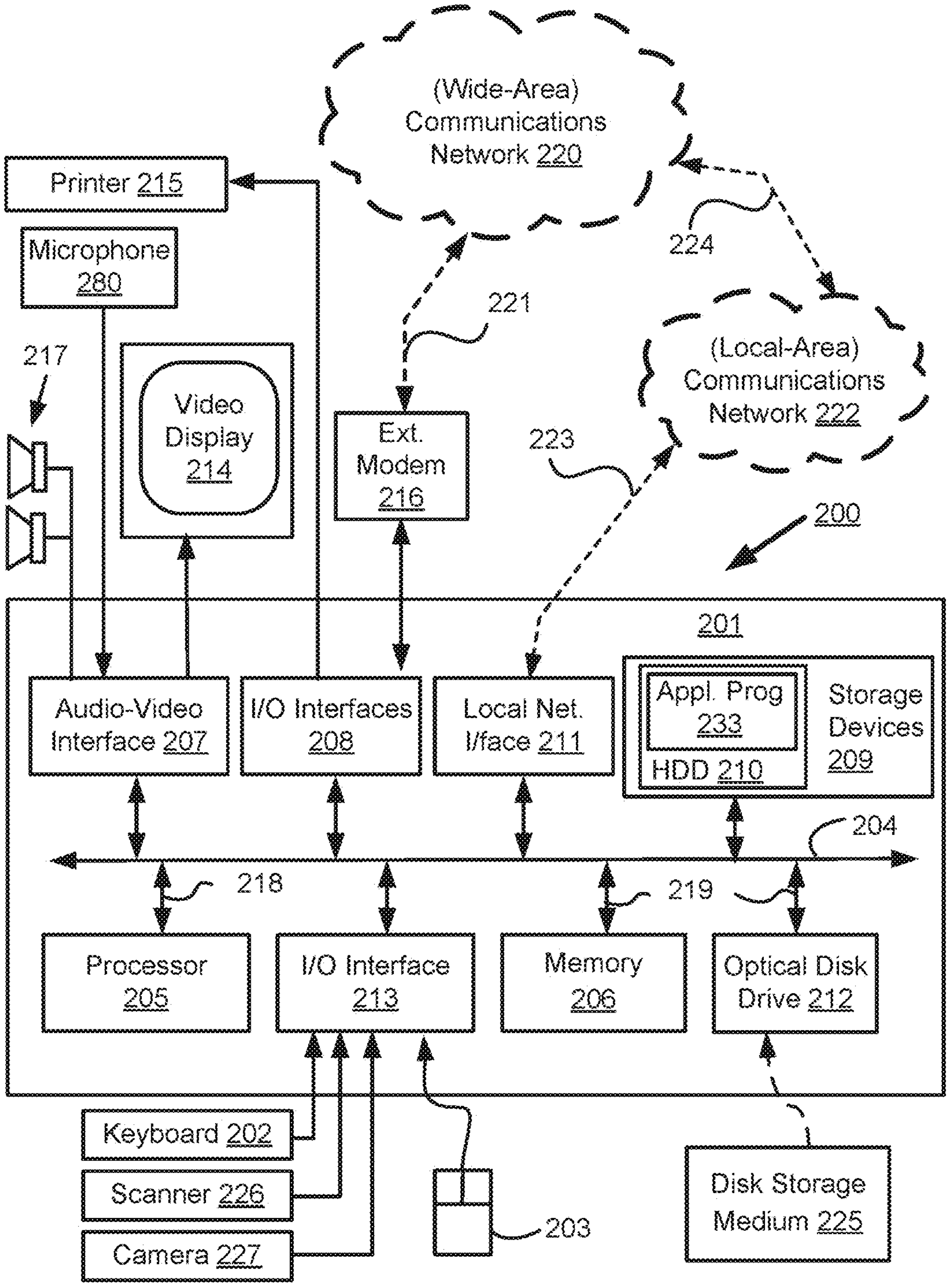
FIGS. 2A and 2B form a schematic block diagram of a general purpose computer system upon which one or both of the video encoding and decoding system of FIG. 1 may be practiced.

Notwithstanding the example devices mentioned above, each of the source device 110 and destination device 130 may be configured within a general purpose computing system, typically through a combination of hardware and software components. FIG. 2A illustrates such a computer system 200, which includes: a computer module 201; input devices such as a keyboard 202, a mouse pointer device 203, a scanner 226, a camera 227, which may be configured as the video source 112, and a microphone 280; and output devices including a printer 215, a display device 214, which may be configured as the display device 136, and loudspeakers 217. An external Modulator-Demodulator (Modem) transceiver device 216 may be used by the computer module 201 for communicating to and from a communications network 220 via a connection 221. The communications network 220, which may represent the communication channel 120, may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable or optical) connection, the modem 216 may be a broadband modem. A wireless modem may also be used for wireless connection to the communications network 220. The transceiver device 216 may provide the functionality of the transmitter 116 and the receiver 132 and the communication channel 120 may be embodied in the connection 221.

The computer module 201 typically includes at least one processor unit 205, and a memory unit 206. For example, the memory unit 206 may have semiconductor random access memory (RAM) and semiconductor read only memory (ROM). The computer module 201 also includes an number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. The signal from the audio-video interface 207 to the computer monitor 214 is generally the output of a computer graphics card. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet™ circuit card, a Bluetooth™ wireless arrangement or an IEEE 802.11 wireless arrangement; however, numerous other types of interfaces may be practiced for the interface 211. The local network interface 211 may also provide the functionality of the transmitter 116 and the receiver 132 and communication channel 120 may also be embodied in the local communications network 222.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g. CD-ROM, DVD, Blu ray Disc™), USB-RAM, portable, external hard drives, and floppy disks, for example, may be used as appropriate sources of data to the computer system 200. Typically, any of the HDD 210, optical drive 212, networks

220 and 222 may also be configured to operate as the video source 112, or as a destination for decoded video data to be stored for reproduction via the display 214. The source device 110 and the destination device 130 of the system 100 may be embodied in the computer system 200.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun SPARCstations, Apple Mac™ or alike computer systems.

Where appropriate or desired, the video encoder 114 and the video decoder 134, as well as methods described below, may be implemented using the computer system 200. In particular, the video encoder 114, the video decoder 134 and methods to be described, may be implemented as one or more software application programs 233 executable within the computer system 200. In particular, the video encoder 114, the video decoder 134 and the steps of the described methods are effected by instructions 231 (see FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 200 from the computer readable medium, and then executed by the computer system 200. A computer readable medium having such software or computer program recorded on the computer readable medium is a computer program product. The use of the computer program product in the computer system 200 preferably effects an advantageous apparatus for implementing the video encoder 114, the video decoder 134 and the described methods.

The software 233 is typically stored in the HDD 210 or the memory 206. The software is loaded into the computer system 200 from a computer readable medium, and executed by the computer system 200. Thus, for example, the software 233 may be stored on an optically readable disk storage medium (e.g., CD-ROM) 225 that is read by the optical disk drive 212.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of the software, application programs, instructions and/or video data or encoded video data to the computer module 401 include radio or infra-red transmission channels, as well as a network connection to another computer or networked device, and the Internet or Intranets including e-mail transmissions and information recorded on Websites and the like.

The second part of the application program 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

Figure 2B:
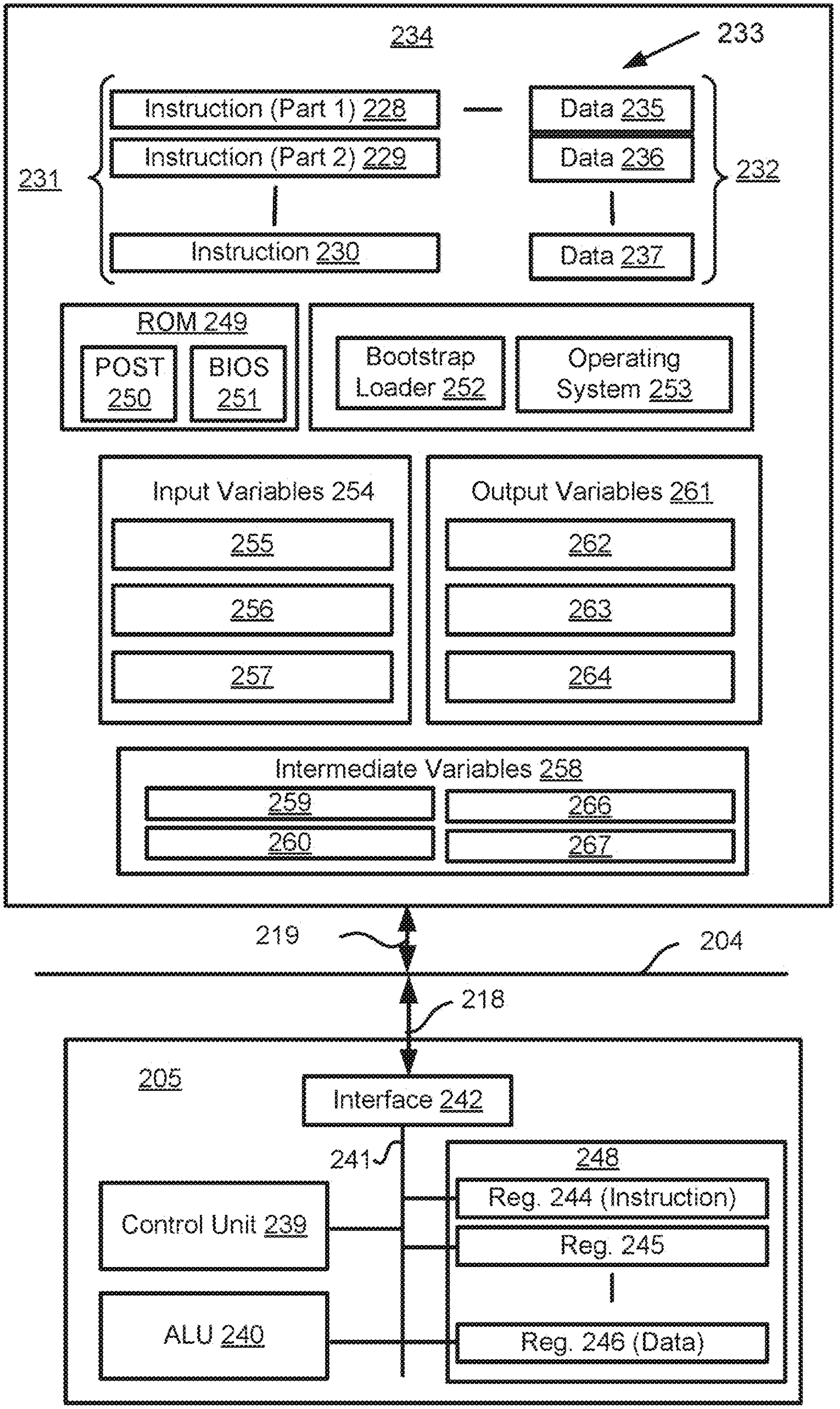

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the computer system 200 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The video encoder 114, the video decoder 134 and the described methods may use input variables 254, which are stored in the memory 234 in corresponding memory locations 255, 256, 257. The video encoder 114, the video decoder 134 and the described methods produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

(a) a fetch operation, which fetches or reads an instruction 231 from a memory location 228, 229, 230;

(b) a decode operation in which the control unit 239 determines which instruction has been fetched; and (c) an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Figure 12:
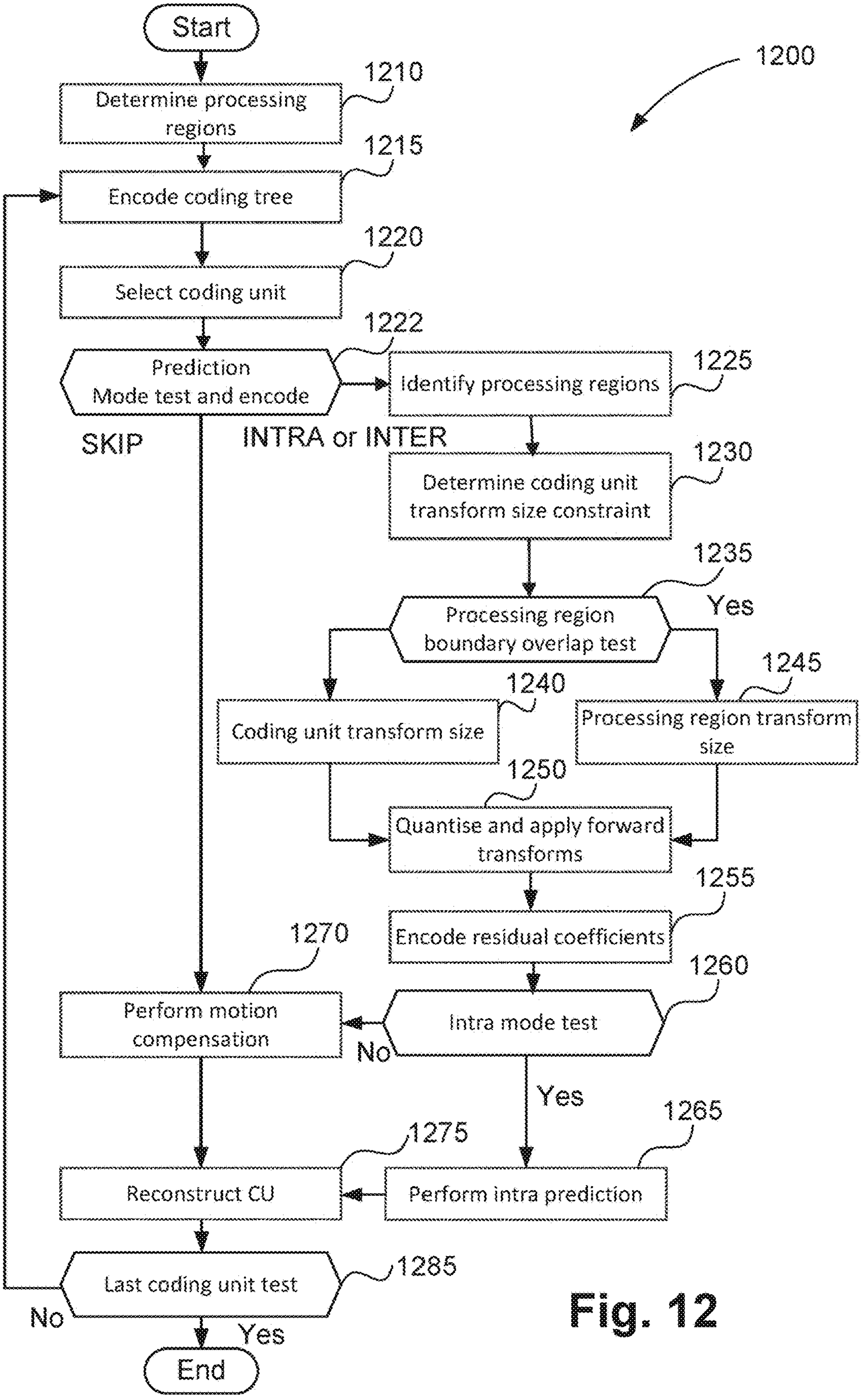
FIG. 12 is a flow chart diagram of a method for encoding a coding unit using transforms, the method enabling pipelined implementations of the video encoder to be realised.
Figure 13:
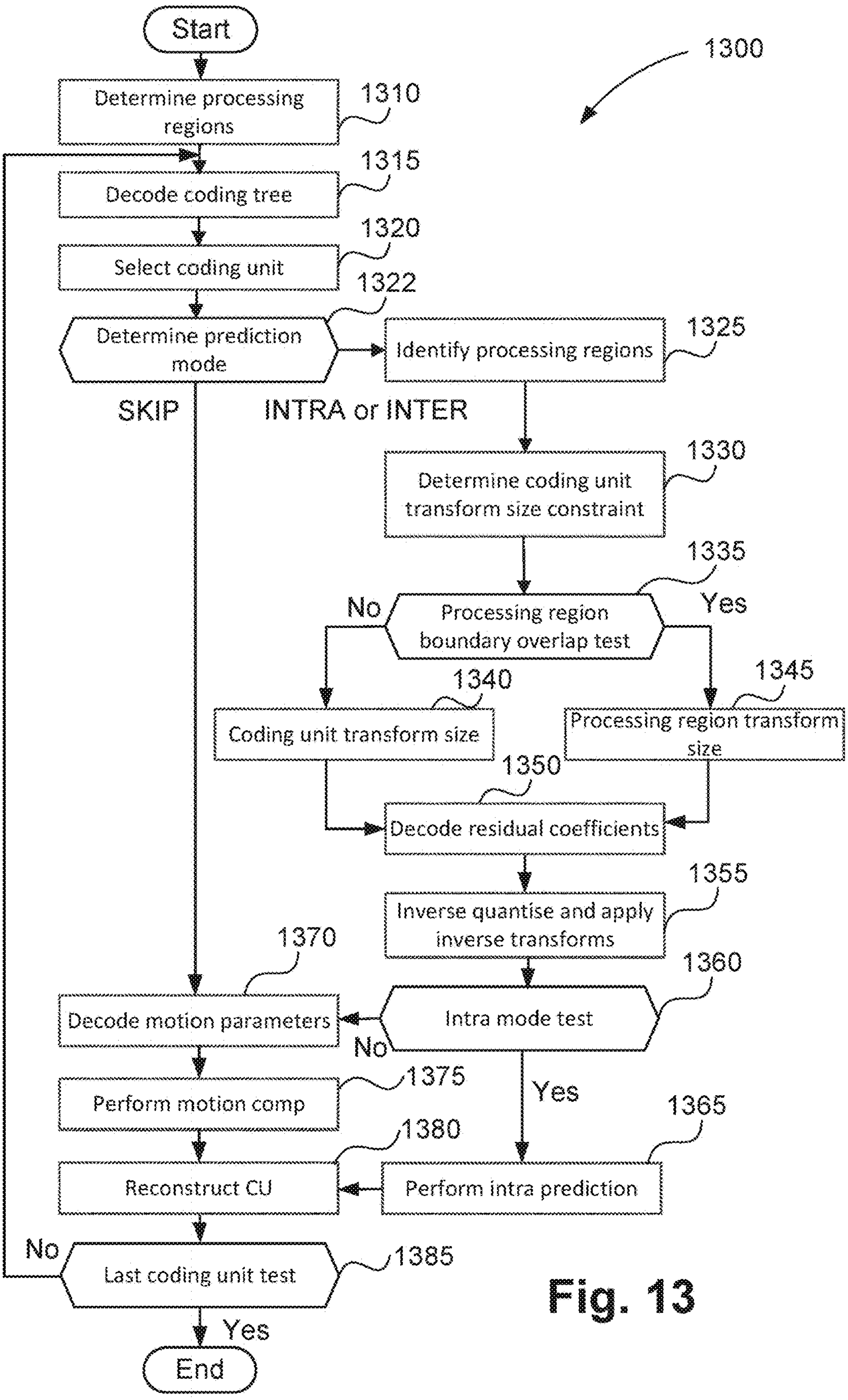
FIG. 13 is a flow chart diagram of a method for decoding a coding unit using transforms, the transform size selected in accordance with the method of FIG. 12.

Each step or sub-process in the method of FIGS. 12 and 13, to be described, is associated with one or more segments of the program 233 and is typically performed by the register section 244, 245, 247, the ALU 240, and the control unit 239 in the processor 205 working together to perform the fetch, decode, and execute cycles for every instruction in the instruction set for the noted segments of the program 233.

Figure 4:
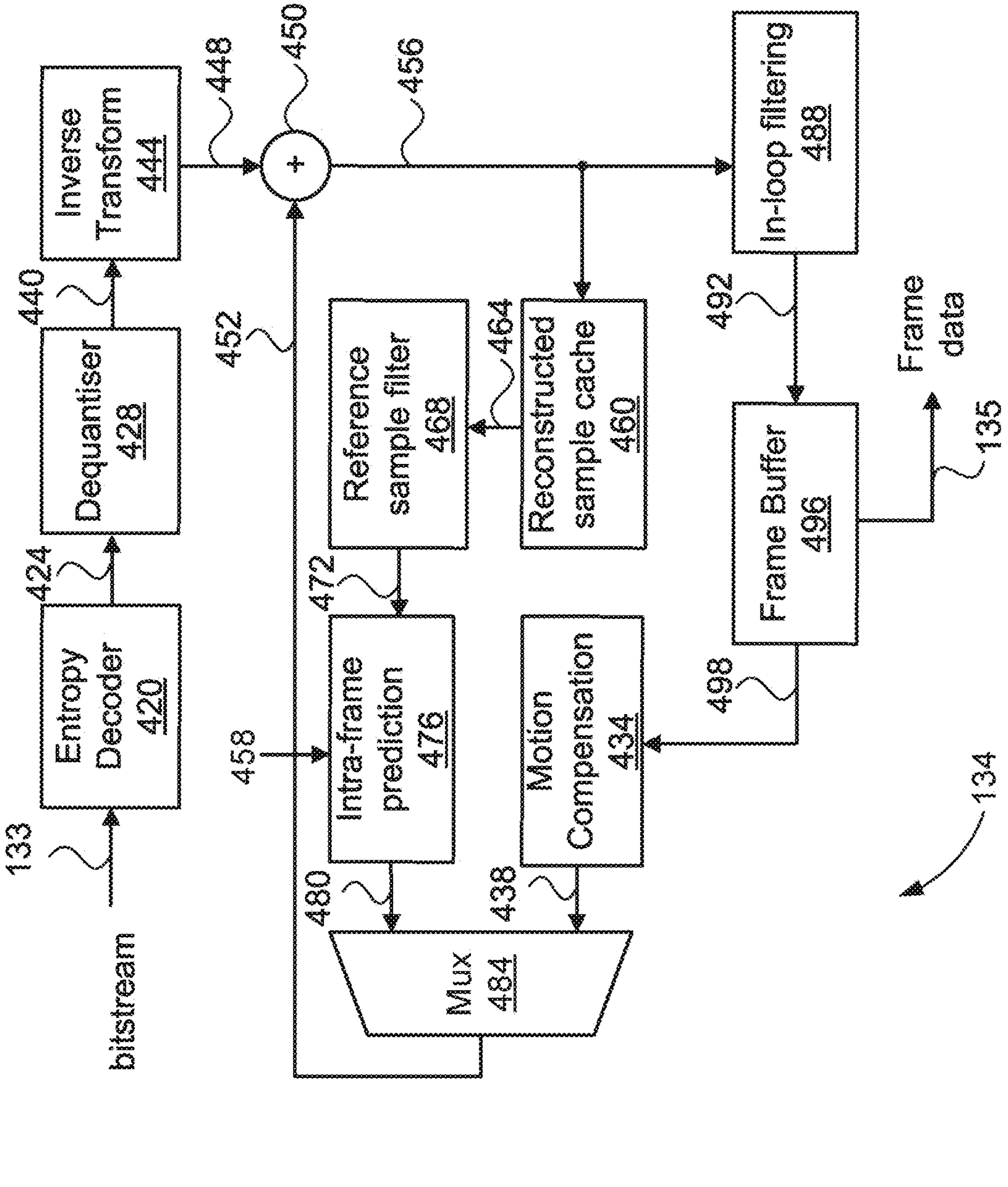
FIG. 4 is a schematic block diagram showing functional modules of a video decoder.

FIG. 3 is a schematic block diagram showing functional modules of the video encoder 114. FIG. 4 is a schematic block diagram showing functional modules of the video decoder 134. Generally, data passes between functional modules within the video encoder 114 and the video decoder 134 in groups of samples or coefficients, such as divisions of blocks into sub-blocks of a fixed size, or as arrays. The video encoder 114 and video decoder 134 may be implemented using a general-purpose computer system 200, as shown in FIGS. 2A and 2B, where the various functional modules may be implemented by dedicated hardware within the computer system 200, by software executable within the computer system 200 such as one or more software code modules of the software application program 233 resident on the hard disk drive 205 and being controlled in its execution by the processor 205. Alternatively the video encoder 114 and video decoder 134 may be implemented by a combination of dedicated hardware and software executable within the computer system 200. The video encoder 114, the video decoder 134 and the described methods may alternatively be implemented in dedicated hardware, such as one or more integrated circuits performing the functions or sub functions of the described methods. Such dedicated hardware may include graphic processing units (GPUs), digital signal processors (DSPs), application-specific standard products (ASSPs), application-specific integrated circuits (ASICs), field programmable gate arrays (FPGAs) or one or more microprocessors and associated memories. In particular, the video encoder 114 comprises modules 310-386 and the video decoder 134 comprises modules 420-496 which may each be implemented as one or more software code modules of the software application program 233.

Although the video encoder 114 of FIG. 3 is an example of a versatile video coding (VVC) video encoding pipeline, other video codecs may also be used to perform the processing stages described herein. The video encoder 114 receives captured frame data 113, such as a series of frames, each frame including one or more colour channels. A block partitioner 310 firstly divides the frame data 113 into CTUs, generally square in shape and configured such that a particular size for the CTUs is used. The size of the CTUs may be 64×64, 128×128, or 256×256 luma samples for example. The block partitioner 310 further divides each CTU into one or more CUs, with the CUs having a variety of sizes, which may include both square and non-square aspect ratios. However, in the VVC standard, CUs, PUs, and TUs always have side lengths that are powers of two. Thus, a current CU, represented as 312, is output from the block partitioner 310, progressing in accordance with an iteration over the one or more blocks of the CTU, in accordance with the coding tree of the CTU. Options for partitioning CTUs into CUs are further described below with reference to FIGS. 5 and 6.

The CTUs resulting from the first division of the frame data 113 may be scanned in raster scan order and may be grouped into one or more 'slices'. A slice may be an 'intra' (or 'I') slice An intra slice (I slice) indicates that every CU in the slice is intra predicted. Alternatively, a slice may be uni- or bi-predicted ('P' or 'B' slice, respectively), indicating additional availability of uni- and bi-prediction in the slice, respectively. As the frame data 113 typically includes multiple colour channels, the CTUs and CUs are associated with the samples from all colour channels that overlap with the block area defined from operation of the block partitioner 310. A CU includes one coding block (CB) for each colour channel of the frame data 113. Due to the potentially differing sampling rate of the chroma channels compared to the luma channel, the dimensions of CBs for chroma channels may differ from those of CBs for luma channels. When using the 4:2:0 chroma format, CBs of chroma channels of a CU have dimensions of half of the width and height of the CB for the luma channel of the CU.

For each CTU, the video encoder 114 operates in two stages. In the first stage (referred to as a 'search' stage), the block partitioner 310 tests various potential configurations of the coding tree. Each potential configuration of the coding tree has associated 'candidate' CUs. The first stage involves testing various candidate CUs to select CUs providing high compression efficiency with low distortion. This testing generally involves a Lagrangian optimisation whereby a candidate CU is evaluated based on a weighted combination of the rate (coding cost) and the distortion (error with respect to the input frame data 113). The 'best' candidate CUs (those with the lowest rate/distortion) are selected for subsequent encoding into the bitstream 115. Included in evaluation of candidate CUs is an option to use a CU for a given area or to split the area according to various splitting options and code each of the smaller resulting areas with further CUs, or split the areas even further. As a consequence, both the CUs and the coding tree themselves are selected in the search stage.

The video encoder 114 produces a prediction unit (PU), indicated by an arrow 320, for each CU, for example the CU 312. The PU 320 is a prediction of the contents of the associated CU 312. A subtracter module 322 produces a difference, indicated as 324 (or 'residual', referring to the difference being in the spatial domain), between the PU 320 and the CU 312. The difference 324 is a block-size difference between corresponding samples in the PU 320 and the CU 312. The difference 324 is transformed, quantised and represented as a transform unit (TU), indicated by an arrow 336. The PU 320 and associated TU 336 are typically chosen as the 'best' one of many possible candidate CUs.

A candidate coding unit (CU) is a CU resulting from one of the prediction modes available to the video encoder 114 for the associated PU and the resulting residual. Each candidate CU results in one or more corresponding TUs, as described hereafter with reference to FIGS. 10-12. The TU 336 is a quantised and transformed representation of the difference 324. When combined with the predicted PU in the decoder 114, the TU 336 reduces the difference between decoded CUs and the original CU 312 at the expense of additional signalling in a bitstream.

Each candidate coding unit (CU), that is prediction unit (PU) in combination with a transform unit (TU), thus has an associated coding cost (or 'rate') and an associated difference (or 'distortion'). The rate is typically measured in bits. The distortion of the CU is typically estimated as a difference in sample values, such as a sum of absolute differences (SAD) or a sum of squared differences (SSD). The estimate resulting from each candidate PU is determined by a mode selector 386 using the difference 324 to determine an intra prediction mode (represented by an arrow 388). Estimation of the coding costs associated with each candidate prediction mode and corresponding residual coding can be performed at significantly lower cost than entropy coding of the residual. Accordingly, a number of candidate modes can be evaluated to determine an optimum mode in a rate-distortion sense.

Determining an optimum mode is typically achieved using a variation of Lagrangian optimisation. Selection of the intra prediction mode 388 typically involves determining a coding cost for the residual data resulting from application of a particular intra prediction mode. The coding cost may be approximated by using a 'sum of absolute transformed differences' (SATD) whereby a relatively simple transform, such as a Hadamard transform, is used to obtain an estimated transformed residual cost. In some implementations using relatively simple transforms, the costs resulting from the simplified estimation method are monotonically related to the actual costs that would otherwise be determined from a full evaluation. In implementations with monotonically related estimated costs, the simplified estimation method may be used to make the same decision (i.e. intra prediction mode) with a reduction in complexity in the video encoder 114. To allow for possible non-monotonicity in the relationship between estimated and actual costs, the simplified estimation method may be used to generate a list of best candidates. The non-monotonicity may result from further mode decisions available for the coding of residual data, for example. The list of best candidates may be of an arbitrary number. A more complete search may be performed using the best candidates to establish mode choices for coding the residual data for each of the candidates, allowing a final selection of the intra prediction mode along with other mode decisions.

The other mode decisions include an ability to skip a forward transform, known as 'transform skip'. Skipping the transforms is suited to residual data that lacks adequate correlation for reduced coding cost via expression as transform basis functions. Certain types of content, such as relatively simple computer generated graphics may exhibit similar behaviour. For a 'skipped transform', residual coefficients are still coded even though the transform itself is not performed.

Lagrangian or similar optimisation processing can be employed to both select a partitioning of a CTU into CUs (by the block partitioner 310) as well as the selection of a best prediction mode from a plurality of possibilities. Through application of a Lagrangian optimisation process of the candidate modes in the mode selector module 386, the intra prediction mode with the lowest cost measurement is selected as the best mode. The best mode is the selected intra prediction mode 388 and is also encoded in the bitstream 115 by an entropy encoder 338. The selection of the intra prediction mode 388 by operation of the mode selector module 386 extends to operation of the block partitioner 310. For example, candidates for selection of the intra prediction mode 388 may include modes applicable to a given block and additionally modes applicable to multiple smaller blocks that collectively are collocated with the given block. In cases including modes applicable to a given block and smaller collocated blocks, the process of selection of candidates implicitly is also a process of determining the best hierarchical decomposition of the CTU into CUs.

In the second stage of operation of the video encoder 114 (referred to as a 'coding' stage), an iteration over the selected coding tree, and hence each selected CU, is performed in the video encoder 114. In the iteration, the CUs are encoded into the bitstream 115, as described further herein.

The entropy encoder 338 supports both variable-length coding of syntax elements and arithmetic coding of syntax elements. Arithmetic coding is supported using a context-adaptive binary arithmetic coding process. Arithmetically coded syntax elements consist of sequences of one or more 'bins'. Bins, like bits, have a value of '0' or '1'. However bins are not encoded in the bitstream 115 as discrete bits. Bins have an associated predicted (or 'likely' or 'most probable') value and an associated probability, known as a 'context'. When the actual bin to be coded matches the predicted value, a 'most probable symbol' (MPS) is coded. Coding a most probable symbol is relatively inexpensive in terms of consumed bits. When the actual bin to be coded mismatches the likely value, a 'least probable symbol' (LPS)

is coded. Coding a least probable symbol has a relatively high cost in terms of consumed bits. The bin coding techniques enable efficient coding of bins where the probability of a '0' versus a '1' is skewed. For a syntax element with two possible values (that is, a 'flag'), a single bin is adequate. For syntax elements with many possible values, a sequence of bins is needed.

The presence of later bins in the sequence may be determined based on the value of earlier bins in the sequence. Additionally, each bin may be associated with more than one context. The selection of a particular context can be dependent on earlier bins in the syntax element, the bin values of neighbouring syntax elements (i.e. those from neighbouring blocks) and the like. Each time a context-coded bin is encoded, the context that was selected for that bin (if any) is updated in a manner reflective of the new bin value. As such, the binary arithmetic coding scheme is said to be adaptive.

Also supported by the video encoder 114 are bins that lack a context ('bypass bins'). Bypass bins are coded assuming an equiprobable distribution between a '0' and a '1'. Thus, each bin occupies one bit in the bitstream 115. The absence of a context saves memory and reduces complexity, and thus bypass bins are used where the distribution of values for the particular bin is not skewed. One example of an entropy coder employing context and adaption is known in the art as CABAC (context adaptive binary arithmetic coder) and many variants of this coder have been employed in video coding.

The entropy encoder 338 encodes the intra prediction mode 388 using a combination of context-coded and bypass-coded bins. Typically, a list of 'most probable modes' is generated in the video encoder 114. The list of most probable modes is typically of a fixed length, such as three or six modes, and may include modes encountered in earlier blocks. A context-coded bin encodes a flag indicating if the intra prediction mode is one of the most probable modes. If the intra prediction mode 388 is one of the most probable modes, further signalling, using bypass-coded bins, is encoded. The encoded further signalling is indicative of which most probable mode corresponds with the intra prediction mode 388, for example using a truncated unary bin string. Otherwise, the intra prediction mode 388 is encoded as a 'remaining mode'. Encoding as a remaining mode uses an alternative syntax, such as a fixed-length code, also coded using bypass-coded bins, to express intra prediction modes other than those present in the most probable mode list.

A multiplexer module 384 outputs the PU 320 according to the determined best intra prediction mode 388, selecting from the tested prediction mode of each candidate CU. The candidate prediction modes need not include every conceivable prediction mode supported by the video encoder 114.

Prediction modes fall broadly into two categories. A first category is 'intra-frame prediction' (also referred to as 'intra prediction'). In intra-frame prediction, a prediction for a block is generated, and the generation method may use other samples obtained from the current frame. For an intra-predicted PU, it is possible for different intra-prediction modes to be used for luma and chroma, and thus intra prediction is described primarily in terms of operation upon PBs rather than PUs.

The second category of prediction modes is 'inter-frame prediction' (also referred to as 'inter prediction'). In inter-frame prediction a prediction for a block is produced using samples from one or two frames preceding the current frame in an order of coding frames in the bitstream. The order of coding frames in the bitstream may differ from the order of the frames when captured or displayed. When one frame is used for prediction, the block is said to be 'uni-predicted' and has one associated motion vector. When two frames are used for prediction, the block is said to be 'bi-predicted' and has two associated motion vectors. For a P slice, each CU may be intra predicted or uni-predicted. For a B slice, each CU may be intra predicted, uni-predicted, or bi-predicted. Frames are typically coded using a 'group of picture' structure, enabling a temporal hierarchy of frames. A temporal hierarchy of frames allows a frame to reference a preceding and a subsequent picture in the order of displaying the frames. The images are coded in the order necessary to ensure the dependencies for decoding each frame are met.

A subcategory of inter prediction is referred to as 'skip mode'. Inter prediction and skip modes are described as two distinct modes. However, both inter prediction mode and skip mode involve motion vectors referencing blocks of samples from preceding frames. Inter prediction involves a coded motion vector delta, specifying a motion vector relative to a motion vector predictor. The motion vector predictor is obtained from a list of one or more candidate motion vectors, selected with a 'merge index'. The coded motion vector delta provides a spatial offset to a selected motion vector prediction. Inter prediction also uses a coded residual in the bitstream 133. Skip mode uses only an index (also named a 'merge index') to select one out of several motion vector candidates. The selected candidate is used without any further signalling. Also, skip mode does not support coding of any residual coefficients. The absence of coded residual coefficients when the skip mode is used means that there is no need to perform transforms for the skip mode. Therefore, skip mode does not typically result in pipeline processing issues. Pipeline processing issues may be the case for intra predicted CUs and inter predicted CUs. Due to the limited signalling of the skip mode, skip mode is useful for achieving very high compression performance when relatively high quality reference frames are available. Bi-predicted CUs in higher temporal layers of a random-access group-of-picture structure typically have high quality reference pictures and motion vector candidates that accurately reflect underlying motion. Consequently, skip mode is useful for bi-predicted blocks in frames at higher temporal layers in a random access group-of-picture structure, to be described with reference to FIG. 8B.

The samples are selected according to a motion vector and reference picture index. The motion vector and reference picture index applies to all colour channels and thus inter prediction is described primarily in terms of operation upon PUs rather than PBs. Within each category (that is, intra- and inter-frame prediction), different techniques may be applied to generate the PU. For example, intra prediction may use values from adjacent rows and columns of previously reconstructed samples, in combination with a direction to generate a PU according to a prescribed filtering and generation process. Alternatively, the PU may be described using a small number of parameters. Inter prediction methods may vary in the number of motion parameters and their precision. Motion parameters typically comprise a reference frame index, indicating which reference frame(s) from lists of reference frames are to be used plus a spatial translation for each of the reference frames, but may include more frames, special frames, or complex affine parameters such as scaling and rotation. In addition, a pre-determined motion refinement process may be applied to generate dense motion estimates based on referenced sample blocks.

Having determined and selected a best PU 320, and subtracted the PU 320 from the original sample block at the subtractor 322, a residual with lowest coding cost, represented as 324, is obtained and subjected to lossy compression. The lossy compression process comprises the steps of transformation, quantisation and entropy coding. A transform module 326 applies a forward transform to the difference 324, converting the difference 324 to the frequency domain, and producing transform coefficients represented by an arrow 332. The forward transform is typically separable, transforming a set of rows and then a set of columns of each block. The transformation of each set of rows and columns is performed by applying one-dimensional transforms firstly to each row of a block to produce a partial result and then to each column of the partial result to produce a final result.

The transform coefficients 332 are passed to a quantiser module 334. At the module 334, quantisation in accordance with a 'quantisation parameter' is performed to produce residual coefficients, represented by the arrow 336. The quantisation parameter is constant for a given TB and thus results in a uniform scaling for the production of residual coefficients for a TB. A non-uniform scaling is also possible by application of a 'quantisation matrix', whereby the scaling factor applied for each residual coefficient is derived from a combination of the quantisation parameter and the corresponding entry in a scaling matrix, typically having a size equal to that of the TB. The residual coefficients 336 are supplied to the entropy encoder 338 for encoding in the bitstream 115. Typically, the residual coefficients of each TB with at least one significant residual coefficient of the TU are scanned to produce an ordered list of values, according to a scan pattern. The scan pattern generally scans the TB as a sequence of 4×4 'sub-blocks', providing a regular scanning operation at the granularity of 4×4 sets of residual coefficients, with the arrangement of sub-blocks dependent on the size of the TB. Additionally, the prediction mode 388 and the corresponding block partitioning are also encoded in the bitstream 115.

As described above, the video encoder 114 needs access to a frame representation corresponding to the frame representation seen in the video decoder 134. Thus, the residual coefficients 336 are also inverse quantised by a dequantiser module 340 to produce inverse transform coefficients, represented by an arrow 342. The inverse transform coefficients 342 are passed through an inverse transform module 348 to produce residual samples, represented by an arrow 350, of the TU. A summation module 352 adds the residual samples 350 and the PU 320 to produce reconstructed samples (indicated by an arrow 354) of the CU.

The reconstructed samples 354 are passed to a reference sample cache 356 and an in-loop filters module 368. The reference sample cache 356, typically implemented using static RAM on an ASIC (thus avoiding costly off-chip memory access) provides minimal sample storage needed to satisfy the dependencies for generating intra-frame PBs for subsequent CUs in the frame. The minimal dependencies typically include a 'line buffer' of samples along the bottom of a row of CTUs, for use by the next row of CTUs and column buffering the extent of which is set by the height of the CTU. The reference sample cache 356 supplies reference samples (represented by an arrow 358) to a reference sample filter 360. The sample filter 360 applies a smoothing operation to produce filtered reference samples (indicated by an arrow 362). The filtered reference samples 362 are used by an intra-frame prediction module 364 to produce an intra-predicted block of samples, represented by an arrow 366. For each candidate intra prediction mode the intra-frame prediction module 364 produces a block of samples, that is 366.

The in-loop filters module 368 applies several filtering stages to the reconstructed samples 354. The filtering stages include a 'deblocking filter' (DBF) which applies smoothing aligned to the CU boundaries to reduce artefacts resulting from discontinuities. Another filtering stage present in the in-loop filters module 368 is an 'adaptive loop filter' (ALF), which applies a Wiener-based adaptive filter to further reduce distortion. A further available filtering stage in the in-loop filters module 368 is a 'sample adaptive offset' (SAO) filter. The SAO filter operates by firstly classifying reconstructed samples into one or multiple categories and, according to the allocated category, applying an offset at the sample level.

Filtered samples, represented by an arrow 370, are output from the in-loop filters module 368. The filtered samples 370 are stored in a frame buffer 372. The frame buffer 372 typically has the capacity to store several (for example up to 16) pictures and thus is stored in the memory 206. The frame buffer 372 is not typically stored using on-chip memory due to the large memory consumption required. As such, access to the frame buffer 372 is costly in terms of memory bandwidth. The frame buffer 372 provides reference frames (represented by an arrow 374) to a motion estimation module 376 and a motion compensation module 380.

The motion estimation module 376 estimates a number of 'motion vectors' (indicated as 378), each being a Cartesian spatial offset from the location of the present CU, referencing a block in one of the reference frames in the frame buffer 372. A filtered block of reference samples (represented as 382) is produced for each motion vector. The filtered reference samples 382 form further candidate modes available for potential selection by the mode selector 386. Moreover, for a given CU, the PU 320 may be formed using one reference block ('uni-predicted') or may be formed using two reference blocks ('bi-predicted'). For the selected motion vector, the motion compensation module 380 produces the PU 320 in accordance with a filtering process supportive of sub-pixel accuracy in the motion vectors. As such, the motion estimation module 376 (which operates on many candidate motion vectors) may perform a simplified filtering process compared to that of the motion compensation module 380 (which operates on the selected candidate only) to achieve reduced computational complexity.

Although the video encoder 114 of FIG. 3 is described with reference to versatile video coding (VVC), other video coding standards or implementations may also employ the processing stages of modules 310-386. The frame data 113 (and bitstream 115) may also be read from (or written to) memory 206, the hard disk drive 210, a CD-ROM, a Blu-ray disk™ or other computer readable storage medium. Additionally, the frame data 113 (and bitstream 115) may be received from (or transmitted to) an external source, such as a server connected to the communications network 220 or a radio-frequency receiver.

The video decoder 134 is shown in FIG. 4. Although the video decoder 134 of FIG. 4 is an example of a versatile video coding (VVC) video decoding pipeline, other video codecs may also be used to perform the processing stages described herein. As shown in FIG. 4, the bitstream 133 is input to the video decoder 134. The bitstream 133 may be read from memory 206, the hard disk drive 210, a CD-ROM, a Blu-ray disk™ or other non-transitory computer readable storage medium. Alternatively, the bitstream 133 may be received from an external source such as a server connected to the communications network 220 or a radio-frequency receiver. The bitstream 133 contains encoded syntax elements representing the captured frame data to be decoded.

The bitstream 133 is input to an entropy decoder module 420. The entropy decoder module 420 extracts syntax elements from the bitstream 133 and passes the values of the syntax elements to other modules in the video decoder 134. The entropy decoder module 420 applies a CABAC algorithm to decode syntax elements from the bitstream 133. The decoded syntax elements are used to reconstruct parameters within the video decoder 134. Parameters include residual coefficients (represented by an arrow 424) and mode selection information such as an intra prediction mode (represented by an arrow 458). The mode selection information also includes information such as motion vectors, and the partitioning of each CTU into one or more CUs. Parameters are used to generate PUs, typically in combination with sample data from previously decoded CUs.

The residual coefficients 424 are input to a dequantiser module 428. The dequantiser module 428 performs inverse quantisation (or 'scaling') on the residual coefficients 424 to create reconstructed transform coefficients, represented by an arrow 440, according to a quantisation parameter. Should use of a non-uniform inverse quantisation matrix be indicated in the bitstream 133, the video decoder 134 reads a quantisation matrix from the bitstream 133 as a sequence of scaling factors and arranges the scaling factors into a matrix. The inverse scaling uses the quantisation matrix in combination with the quantisation parameter to create the reconstructed intermediate transform coefficients.

The reconstructed transform coefficients 440 are passed to an inverse transform module 444. The module 444 transforms the coefficients from the frequency domain back to the spatial domain. The TB is effectively based on significant residual coefficients and non-significant residual coefficient values. The result of operation of the module 444 is a block of residual samples, represented by an arrow 448. The residual samples 448 are equal in size to the corresponding CU. The residual samples 448 are supplied to a summation module 450. At the summation module 450 the residual samples 448 are added to a decoded PU (represented as 452) to produce a block of reconstructed samples, represented by an arrow 456. The reconstructed samples 456 are supplied to a reconstructed sample cache 460 and an in-loop filtering module 488. The in-loop filtering module 488 produces reconstructed blocks of frame samples, represented as 492. The frame samples 492 are written to a frame buffer 496.

The reconstructed sample cache 460 operates similarly to the reconstructed sample cache 356 of the video encoder 114. The reconstructed sample cache 460 provides storage for reconstructed sample needed to intra predict subsequent CUs without the memory 206 (for example by using the data 232 instead, which is typically on-chip memory). Reference samples, represented by an arrow 464, are obtained from the reconstructed sample cache 460 and supplied to a reference sample filter 468 to produce filtered reference samples indicated by arrow 472. The filtered reference samples 472 are supplied to an intra-frame prediction module 476. The module 476 produces a block of intra-predicted samples, represented by an arrow 480, in accordance with the intra prediction mode parameter 458 signalled in the bitstream 133 and decoded by the entropy decoder 420.

When intra prediction is indicated in the bitstream 133 for the current CU, the intra-predicted samples 480 form the decoded PU 452 via a multiplexor module 484.

When inter prediction is indicated in the bitstream 133 for the current CU, a motion compensation module 434 produces a block of inter-predicted samples, represented as 438, using a motion vector and reference frame index to select and filter a block of samples from a frame buffer 496. The block of samples 498 is obtained from a previously decoded frame stored in the frame buffer 496. For bi-prediction, two blocks of samples are produced and blended together to produce samples for the decoded PU 452. The frame buffer 496 is populated with filtered block data 492 from an in-loop filtering module 488. As with the in-loop filtering module 368 of the video encoder 114, the in-loop filtering module 488 applies any, at least, or all of the DBF, the ALF and SAO filtering operations. The in-loop filtering module 368 produces the filtered block data 492 from the reconstructed samples 456.

Figure 5:
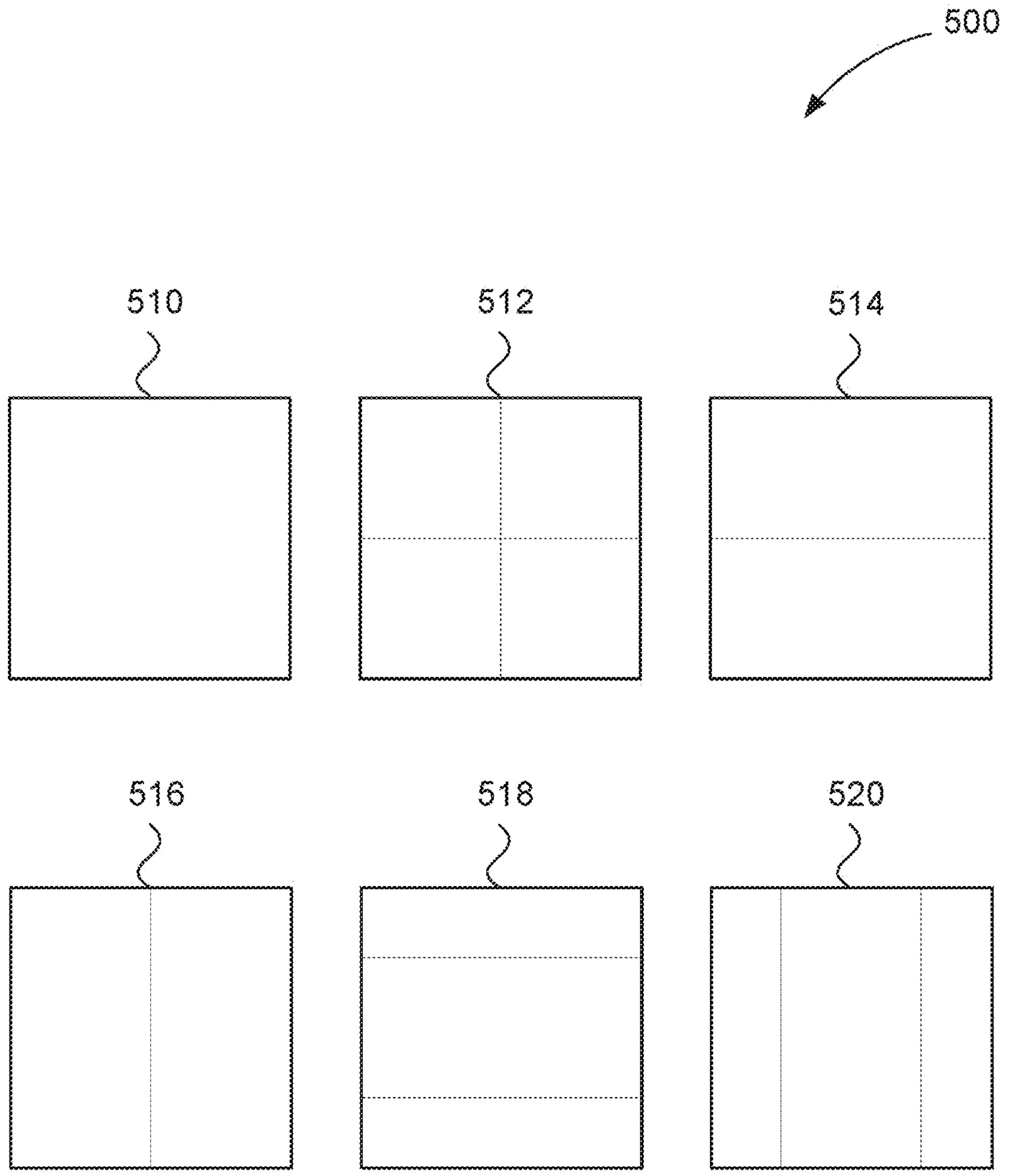
FIG. 5 is a schematic block diagram showing the available divisions of a block into one or more blocks in the tree structure of versatile video coding.

FIG. 5 is a schematic block diagram showing a collection 500 of available divisions or splits of a region into one or more sub-regions in the tree structure of versatile video coding. The divisions shown in the collection 500 are available to the block partitioner 310 of the encoder 114 to divide each CTU into one or more CUs according to a coding tree, as determined by the Lagrangian optimisation, as described with reference to FIG. 3.

Although the collection 500 shows only square regions being divided into other, possibly non-square sub-regions, it should be understood that the diagram 500 is showing the potential divisions but not requiring the containing region to be square. If the containing region is non-square, the dimensions of the blocks resulting from the division are scaled according to the aspect ratio of the containing block. Once a region is not further split, that is, at a leaf node of the coding tree, a CU occupies that region. The particular subdivision of a CTU into one or more CUs by the block partitioner 310 is referred to as the 'coding tree' of the CTU. The process of subdividing regions into sub-regions must terminate when the resulting sub-regions reach a minimum CU size. In addition to constraining CUs to prohibit sizes smaller than for example 4×4, CUs are constrained to have a minimum width or height of four. Other minimums, both in terms of width and height or in terms of width or height are also possible. The process of subdivision may also terminate prior to the deepest level of decomposition, resulting in a CU larger than the minimum CU size. It is possible for no splitting to occur, resulting in a single CU occupying the entirety of the CTU. A single CU occupying the entirety of the CTU is the largest available coding unit size. Moreover, CUs where no splitting occurs are larger than the processing region size. As a result of binary or ternary splitting at the highest level of a coding tree, CU sizes such as 64×128, 128×64, 32×128, and 128×32 are possible, each of which are also larger than the processing region size. Examples of CUS larger than the processing region size described further with reference to FIGS. 10A-10F.

At the leaf nodes of the coding tree exist CUs, with no further subdivision. For example, a leaf node 510 contains one CU. At the non-leaf nodes of the coding tree exist either a split into two or more further nodes, each of which could either contain a leaf node that thus one CU or contain further splits into smaller regions.

A quad-tree split 512 divides the containing region into four equal-size regions as shown in FIG. 5. Compared to HEVC, versatile video coding (VVC) achieves additional flexibility with the addition of a horizontal binary split 514 and a vertical binary split 516. Each of the splits 514 and 516 divides the containing region into two equal-size regions. The division is either along a horizontal boundary (514) or a vertical boundary (516) within the containing block.

Further flexibility is achieved in versatile video coding with the addition of a ternary horizontal split 518 and a ternary vertical split 520. The ternary splits 518 and 520 divide the block into three regions, bounded either horizontally (518) or vertically (520) along ¼ and ¾ of the containing region width or height. The combination of the quad tree, binary tree, and ternary tree is referred to as 'QTBTTT' or alternatively as a multi-tree (MT).

Compared to HEVC, which supports only the quad tree and thus only supports square blocks, the QTBTTT results in many more possible CU sizes, particularly considering possible recursive application of binary tree and/or ternary tree splits. The potential for unusual (for example, non-square) block sizes may be reduced by constraining split options to eliminate splits that would result in a block width or height either being less than four samples or in not being a multiple of four samples. Generally, the constraint would apply in considering luma samples. However, the constraint may also apply separately to the blocks for the chroma channels, potentially resulting in differing minimum block sizes for luma versus chroma, for example when the frame data is in the 4:2:0 chroma format. Each split produces sub-regions with a side dimension either unchanged, halved or quartered, with respect to the containing region. Then, since the CTU size is a power of two, the side dimensions of all CUs are also powers of two.

Figure 6:
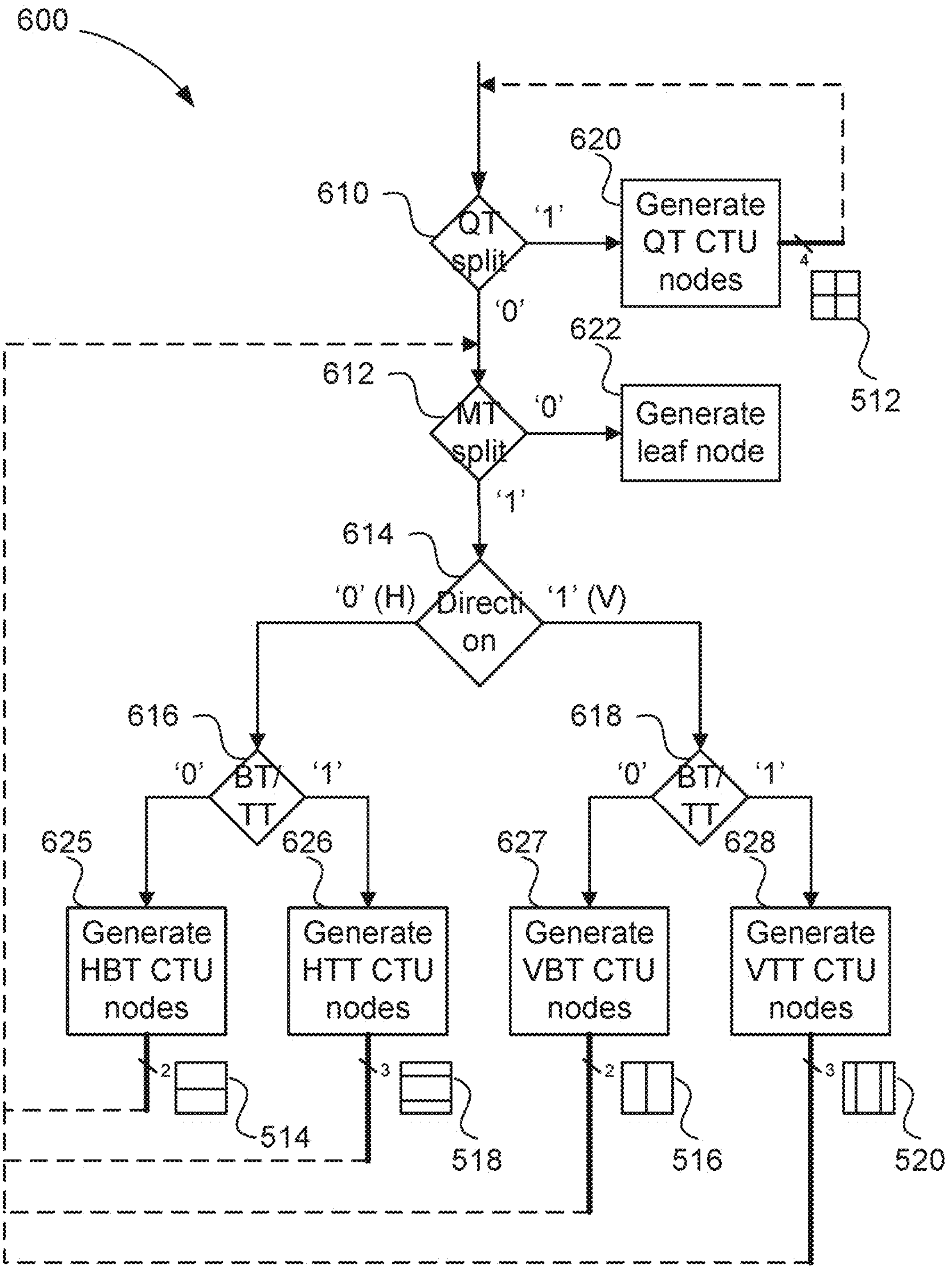
FIG. 6 is a schematic illustration of a dataflow to achieve permitted divisions of a block into one or more blocks in a tree structure of versatile video coding.

FIG. 6 is a schematic flow diagram illustrating a data flow 600 of a QTBTTT (or 'coding tree') structure used in versatile video coding. The QTBTTT structure is used for each CTU to define a division of the CTU into one or more CUs. The QTBTTT structure of each CTU is determined by the block partitioner 310 in the video encoder 114 and encoded into the bitstream 115 or decoded from the bitstream 133 by the entropy decoder 420 in the video decoder 134. The data flow 600 further characterises the permissible combinations available to the block partitioner 310 for dividing a CTU into one or more CUs, according to the divisions shown in FIG. 5.

Starting from the top level of the hierarchy, that is at the CTU, zero or more quad-tree divisions are first performed. Specifically, a Quad-tree (QT) split decision 610 is made by the block partitioner 310. The decision at 610 returning a '1' symbol indicates a decision to split the current node into four sub-nodes according to the quad-tree split 512. The result is the generation of four new nodes, such as at 620, and for each new node, recursing back to the QT split decision 610. Each new node is considered in raster (or Z-scan) order. Alternatively, if the QT split decision 610 indicates that no further split is to be performed (returns a '0' symbol), quad-tree partitioning ceases and multi-tree (MT) splits are subsequently considered.

Firstly, an MT split decision 612 is made by the block partitioner 310. At 612, a decision to perform an MT split is indicated. Returning a '0' symbol at decision 612 indicates that no further splitting of the node into sub-nodes is to be performed. If no further splitting of a node is to be performed, then the node is a leaf node of the coding tree and corresponds to a CU. The leaf node is output at 622. Alternatively, if the MT split 612 indicates a decision to perform an MT split (returns a '1' symbol), the block partitioner 310 proceeds to a direction decision 614.

The direction decision 614 indicates the direction of the MT split as either horizontal ('H' or '0') or vertical ('V' or '1'). The block partitioner 310 proceeds to a decision 616 if the decision 614 returns a '0' indicating a horizontal direction. The block partitioner 310 proceeds to a decision 618 if the decision 614 returns a '1' indicating a vertical direction.

At each of the decisions 616 and 618, the number of partitions for the MT split is indicated as either two (binary split or 'BT' node) or three (ternary split or 'TT') at the BT/TT split. That is, a BT/TT split decision 616 is made by the block partitioner 310 when the indicated direction from 614 is horizontal and a BT/TT split decision 618 is made by the block partitioner 310 when the indicated direction from 614 is vertical.

The BT/TT split decision 616 indicates whether the horizontal split is the binary split 514, indicated by returning a '0', or the ternary split 518, indicated by returning a '1'. When the BT/TT split decision 616 indicates a binary split, at a generate HBT CTU nodes step 625 two nodes are generated by the block partitioner 310, according to the binary horizontal split 514. When the BT/TT split 616 indicates a ternary split, at a generate HTT CTU nodes step 626 three nodes are generated by the block partitioner 310, according to the ternary horizontal split 518.

The BT/TT split decision 618 indicates whether the vertical split is the binary split 516, indicated by returning a '0', or the ternary split 520, indicated by returning a '1'. When the BT/TT split 618 indicates a binary split, at a generate VBT CTU nodes step 627 two nodes are generated by the block partitioner 310, according to the vertical binary split 516. When the BT/TT split 618 indicates a ternary split, at a generate VTT CTU nodes step 628 three nodes are generated by the block partitioner 310, according to the vertical ternary split 520. For each node resulting from steps 625-628 recursion of the data flow 600 back to the MT split decision 612 is applied, in a left-to-right or top-to-bottom order, depending on the direction 614. As a consequence, the binary tree and ternary tree splits may be applied to generate CUs having a variety of sizes.

Figure 7A:
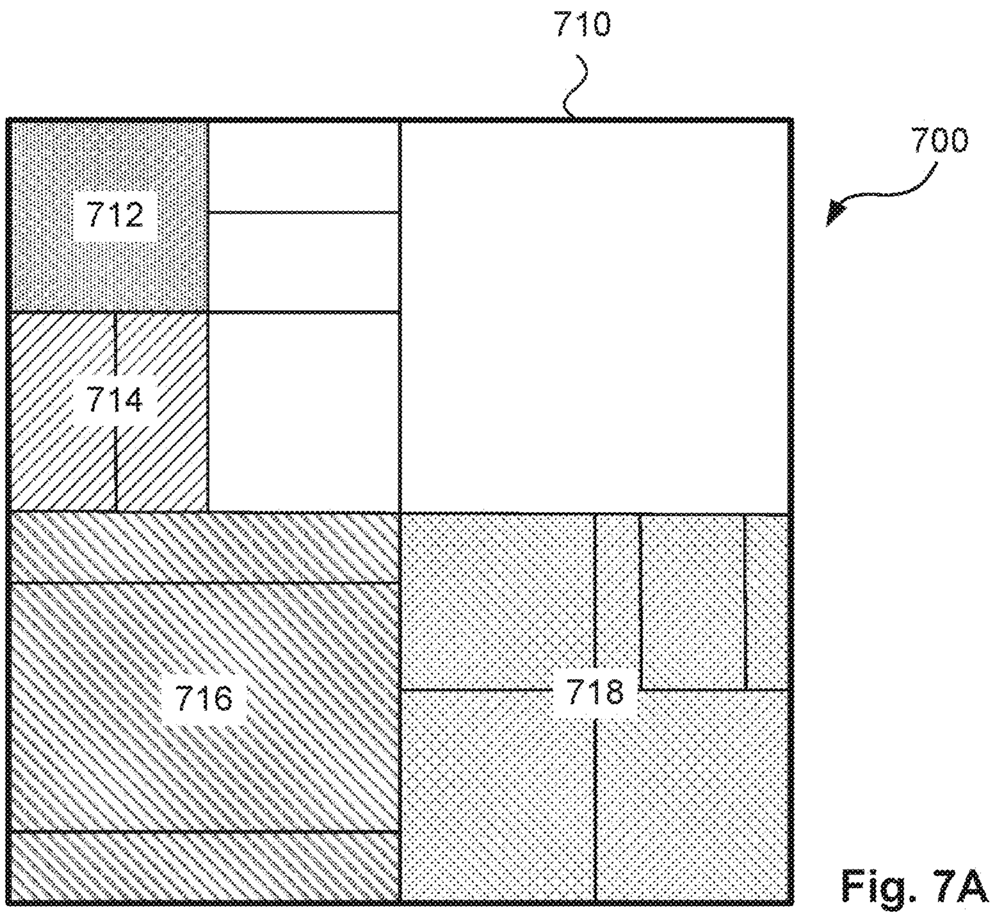
FIGS. 7A and 7B show an example division of a coding tree unit (CTU) into a number of coding units.
Figure 7B:
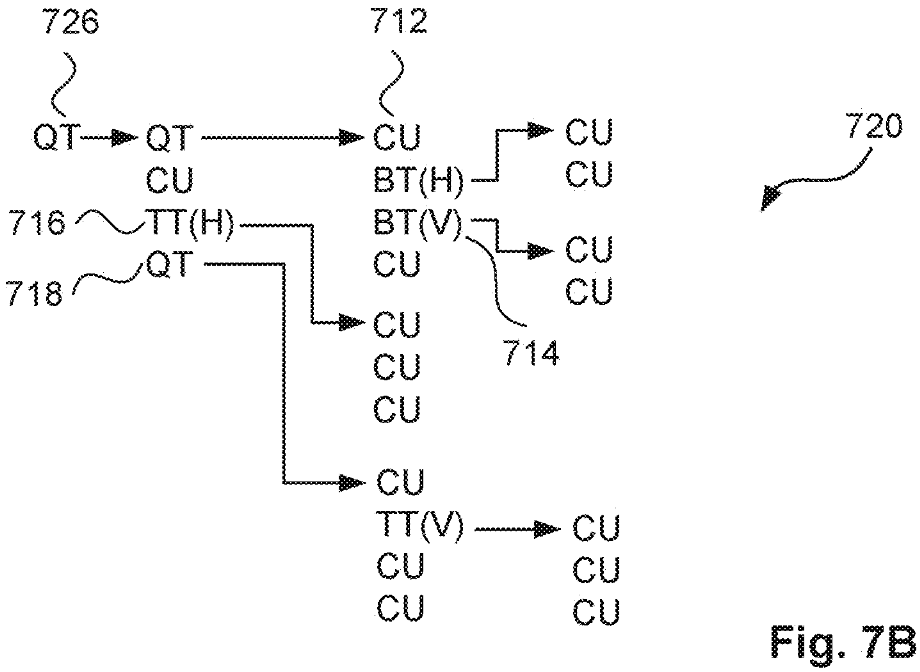

FIGS. 7A and 7B provide an example division 700 of a CTU 710 into a number of CUs. An example CU 712 is shown in FIG. 7A. FIG. 7A shows a spatial arrangement of CUs in the CTU 710. The example division 700 is also shown as a coding tree 720 in FIG. 7B.

At each non-leaf node in the CTU 710 of FIG. 7A, for example nodes 714, 716 and 718, the contained nodes (which may be further divided or may be CUs) are scanned or traversed in a 'Z-order' to create lists of nodes, represented as columns in the coding tree 720. For a quad-tree split, the Z-order scanning results in top left to right followed by bottom left to right order. For horizontal and vertical splits, the Z-order scanning (traversal) simplifies to a top-to-bottom scan and a left-to-right scan, respectively. The coding tree 720 of FIG. 7B lists all nodes and CUs according to the applied scan order. Each split generates a list of two, three or four new nodes at the next level of the tree until a leaf node (CU) is reached.

Having decomposed the image into CTUs and further into CUs by the block partitioner 310, and using the CUs to generate each residual block (324) as described with reference to FIG. 3, residual blocks are subject to forward transformation and quantisation by the video encoder 114. The resulting TBs 336 are subsequently scanned to form a sequential list of residual coefficients, as part of the operation of the entropy coding module 338. An equivalent process is performed in the video decoder 134 to obtain TBs from the bitstream 133.

Figure 8A:
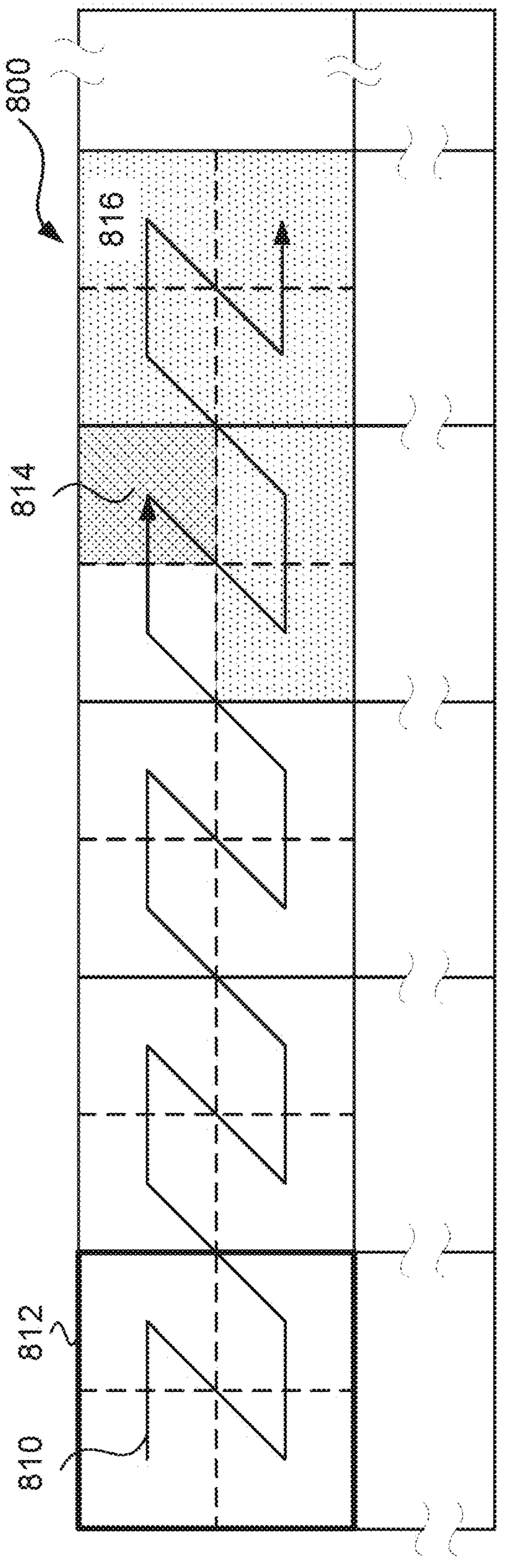
FIG. 8A shows an example sequence of coding tree units (CTUs) being processed according to a pipelined architecture.

FIG. 8A shows an example frame 800 including a sequence of CTUs, for example a CTU 812, followed by subsequent CTUs. Each CTU has a size of 128×128 luma samples. If the frame 800 were to be processed on a CTU-by-CTU basis using local memory of the processor 205 or an integrated circuit, due to the CTU size, 128×128 luma samples, the resulting local memory requirements would be prohibitive. Implementations of the video encoder 114 and the video decoder 134 described herein can reduce on-chip memory consumption by processing the image data or bitstream in regions smaller than that of a CTU. On-chip memory is particularly costly as on-chip memory consumes a large area on a die. Software implementations may also benefit by confining more memory access to low levels of cache (e.g L1 and L2 cache), reducing the need to access external memory. Thus, for reduced memory consumption, implementations of the video encoder 114 and the video decoder 134 can process data at a smaller granularity than the granularity of one CTU at a time.

The smaller granularity may be a region (or 'pipeline processing region') size of 64×64 luma samples, similar to one quadtree subdivision of a CTU. Moreover, the smaller granularity defines a region, treated as an indivisible region. The indivisible region is passed through each processing stage of a pipelined architecture. The pipelined processing region is considered indivisible in the sense that the region defines one aggregation or chunk of data (such as samples, a collection of blocks and coefficients, a portion of the bitstream) that corresponds to a particular area on the frame (such as the frame 800) and is passed through the pipeline. Within the region, there can be various arrangements of CUs, and CUs may span multiple of the smaller granularity regions. The regions allow each pipeline processing stage to locally store only data associated with the smaller region, for example 64×64 luma samples or less, as opposed to data associated with the full CTU size of 128×128.

A corresponding local memory reduction for the chroma data is also realised using the pipeline processing regions described. Within each CTU, regions are processed in a Z-order. The processing progresses from CTU to CTU in a raster scan manner, as shown by a region scan 810. From the perspective of the video decoder 134, the first pipeline stage is the entropy decoder 420. Although the bitstream 133 is parsed sequentially, the parsed syntax elements may be grouped according to regions. For example, a region 814 of FIG. 8A is firstly processed by the entropy decoder 420. Once one region is processed by the entropy decoder 420, the associated syntax elements are passed to a second pipeline stage. The second pipeline stage may be the inverse quantiser 428 and the inverse transform 444. The modules 428 and 444 perform upon all CUs in the region to produce the residual samples 448 for the region. Once the second stage completes, the residual samples 448 for the region are passed along to a third stage. The third stage may include the summation 450 (intra reconstruction), reference sample cache 460, reference sample filter 468, and intra-frame prediction module 476. The third stage modules form a feedback loop, as shown in, and described with reference to, FIG. 4. The feedback loop exists between adjacent CUs and thus exists both within a region and from one region to the next. The feedback loop necessitates the third stage modules being performed within one pipeline stage. The in-loop filtering 488 is typically performed in one or more subsequent pipeline stages.

A separate feedback loop for inter prediction, involving the frame buffer 496 and the motion compensation module 434 can also be implemented. However, the feedback loop for inter prediction is from the current frame to preceding frames and thus does not affect a pipelined operation at the CTU level. Regions of FIG. 8A, for example 816, that are yet to be processed are shown with light shading.

In accordance with the coding tree of each CTU, a region may contain a variety of CUs, of various sizes, for example as described with respect to FIGS. 7A and 7B. The example of FIGS. 7A and 7B includes a quadtree split at the top level of the coding tree, indicated as 726 in FIG. 7B. The quadtree division into four 64×64 regions, which are further divided into CUs of various sizes, is aligned with the pipelined processing region size of 64×64. When coding image frames containing highly detailed textures and with no available reference pictures, as is the case for 'intra' frames, the likelihood that at least one quadtree split would occur is high. Thus, for intra frame coding, a smaller CTU size, for example 64×64, compared to the CTU size used for inter-predicted frames of 128×128, may be used without imposing a compression performance penalty of unacceptable levels to a user.

The use of a smaller CTU size, in particular a size that does not exceed the region size for pipelined processing, ensures that no CU and thus no TU spans across multiple regions. The transform is an operation that needs to be performed within one pipeline stage, as data dependencies within the transform span across the TB, such that each residual coefficient affects every output sample from a TB. As a result, a transform represents a minimum level at which pipeline operations must be 'atomic' (not further divided), so the data for a given transform must be fully contained within one pipeline processing region or chunk of data in the pipeline.

Within a pipeline processing region however, multiple CUs and thus multiple transforms are possible, as each transform is fully contained within the processing region. Limits on the transform size set a worst case for the number of transforms that may be encountered within a processing region. For example, with a 64×64 processing region and considering the luma channel, the maximum number of 4×4 transforms that may be encountered within the processing region are 16×16=256. The maximum number of 8×8 transforms that may be encountered within the processing region are 8×8=64 and so on, up to the 64×64 transform, for which only one may be performed in one pipeline processing region. Similar calculations apply for the chroma channels.

For inter predicted CUs, relatively larger CUs become a possibility, the possibility of larger CUs occurs because of the availability of one or more reference frames that may contain highly matching reference blocks. The video encoder 114 may select a large CU and, in doing so, copy a large block of samples from a reference frame to the current frame.

One approach to coding an inter predicted CU is via 'skip mode'. A CU coded in skip mode is indicated to have no significant residual coefficients and to obtain the corresponding motion vector from a spatial or temporal neighbour, selected using a 'merge index'. The absence of any significant residual coefficients implies an absence of the need to perform any inverse quantisation or inverse transformation steps. As such, the placement of skip mode CUs within a CTU is not constrained as a consequence of pipelined and there is no need to determine a TU size for a skip mode CU. Skip mode CUs do not introduce difficulty in processing for particular CU alignments with respect to the pipeline processing regions. Skip mode CUs are typically used where high-quality reference frames are available with easily modelled motion parameters. Accordingly, skip mode CUs are selected for blocks where the decoder can predict the motion vector accurately. The motion vector selects a reference block highly matching the desired output at the CU.

Use of skip modes is not restricted to portions of an image containing relatively low detail. Image portions containing highly detailed textures may be copied with low cost as the coding tree terminates at a large CU size and coding of motion vectors to specify spatial displacement is highly efficient, especially via the merge index coding. Frames in higher temporal layers of a random-access group-of-picture structure are an example where skip mode provides a high degree of compression performance. The flexible block structure described using FIG. 6, in combination with a relatively large CTU size of 128×128 for example, enables large CUs to be placed fairly flexibly within each CTU. Accordingly, the decoder or encoder can adapt to changes in the motion field, for example as typically happens at the boundary between foreground and background objects. Large CUs typically become prevalent at low bit rates. Further, these large CUs may span multiple pipeline processing regions and need not be constrained to avoid spanning across pipeline processing regions. Applying a constraint to avoid spanning across pipeline processing regions would be equivalent to a reduction in the CTU size. Reducing CTU size would limit the flexibility both in CU size and placement within each CTU, undesirably reducing compression efficiency.

Figure 8B:
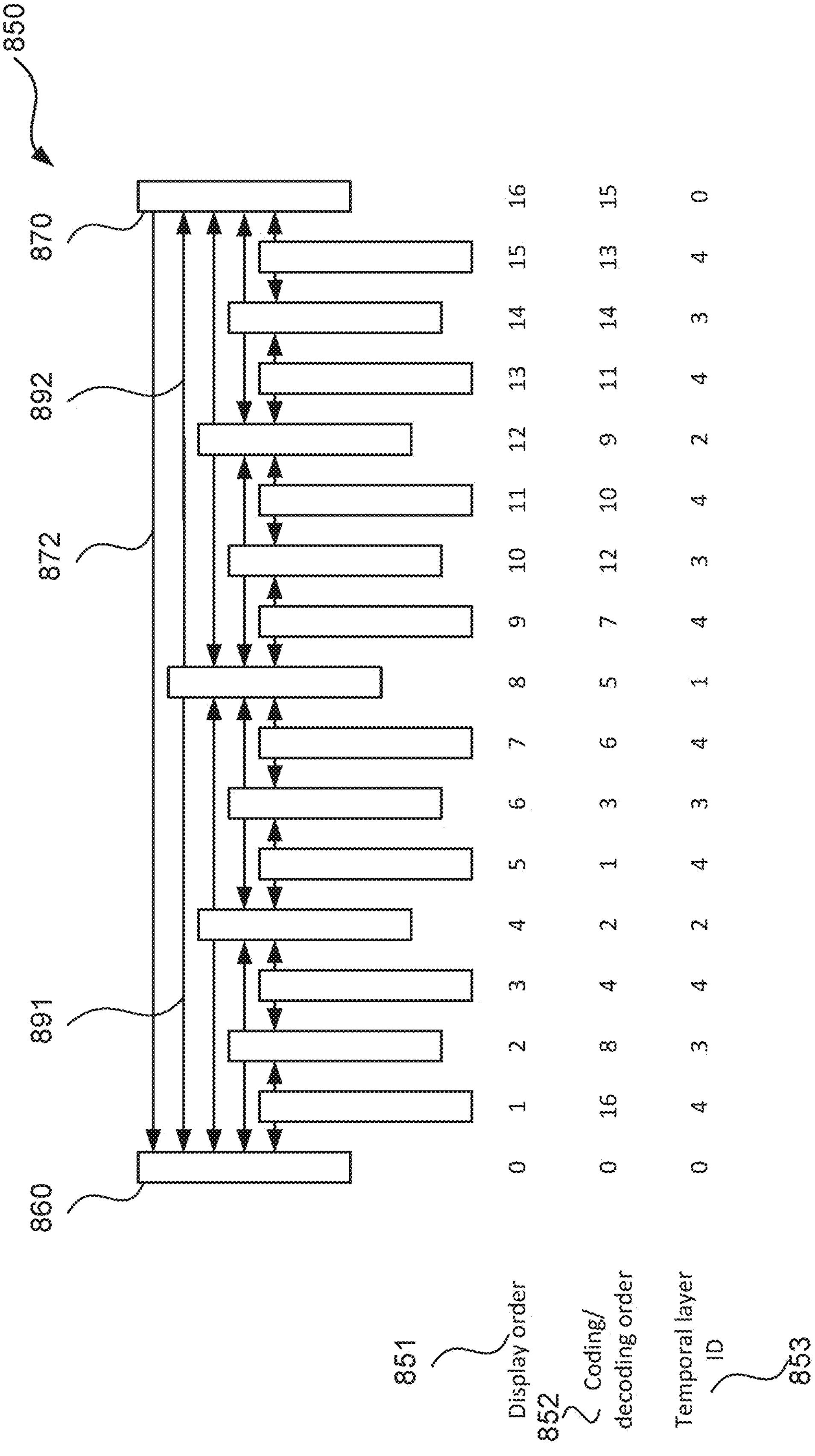
FIG. 8B shows an example 'random access' group-of-picture structure of frames in a video.

FIG. 8B is an example 'random access' group-of-picture (GOP) structure 850 of frames in a video. A sequence of seventeen frames is shown. For each frame, a display order 851, a coding order 852, and a temporal layer ID 853 is shown in the structure 850. The video commences with an intra frame 860. As the reference picture buffer is empty, the intra frame 860 may only include intra-predicted CUs. The second frame to be coded is a uni-predicted frame (P slice) 870 (as the second value of the coding order 852 is '16'). The uni-predicted frame 870 is coded following the intra frame 860 and may only reference the frame 860, as shown by an arrow 872. However, the display order of the frame 870 is 16, so a relatively large change in the content of between frames 860 and 870 is likely. Accordingly, the coding cost of the frame 870 is relatively high However, the coding cost of the frame 870 is less than the coding cost of the intra frame 860, where no reference frame is available.

Intermediate frames are able to use bi-prediction, as shown by each frame having two arrows to the available reference frames, for example arrows 891 and 892 in FIG. 8B. At higher temporal layers, the distance from a frame to the corresponding reference frames (the delta in the display order) is less. Generally, when the distance from a frame to the corresponding reference frame is less, compression performance is higher as the underlying image data is changed less between the frames. Frames at higher temporal layers are generally able to use both larger CUs and make use of the skip mode more frequently. An exception is where an occluded object becomes visible. When an occluded object becomes visible, there is typically no available reference block within the constraints of the group-of pictures (GOP) structure and the use of smaller CUs with intra prediction becomes more likely.

Figure 9:
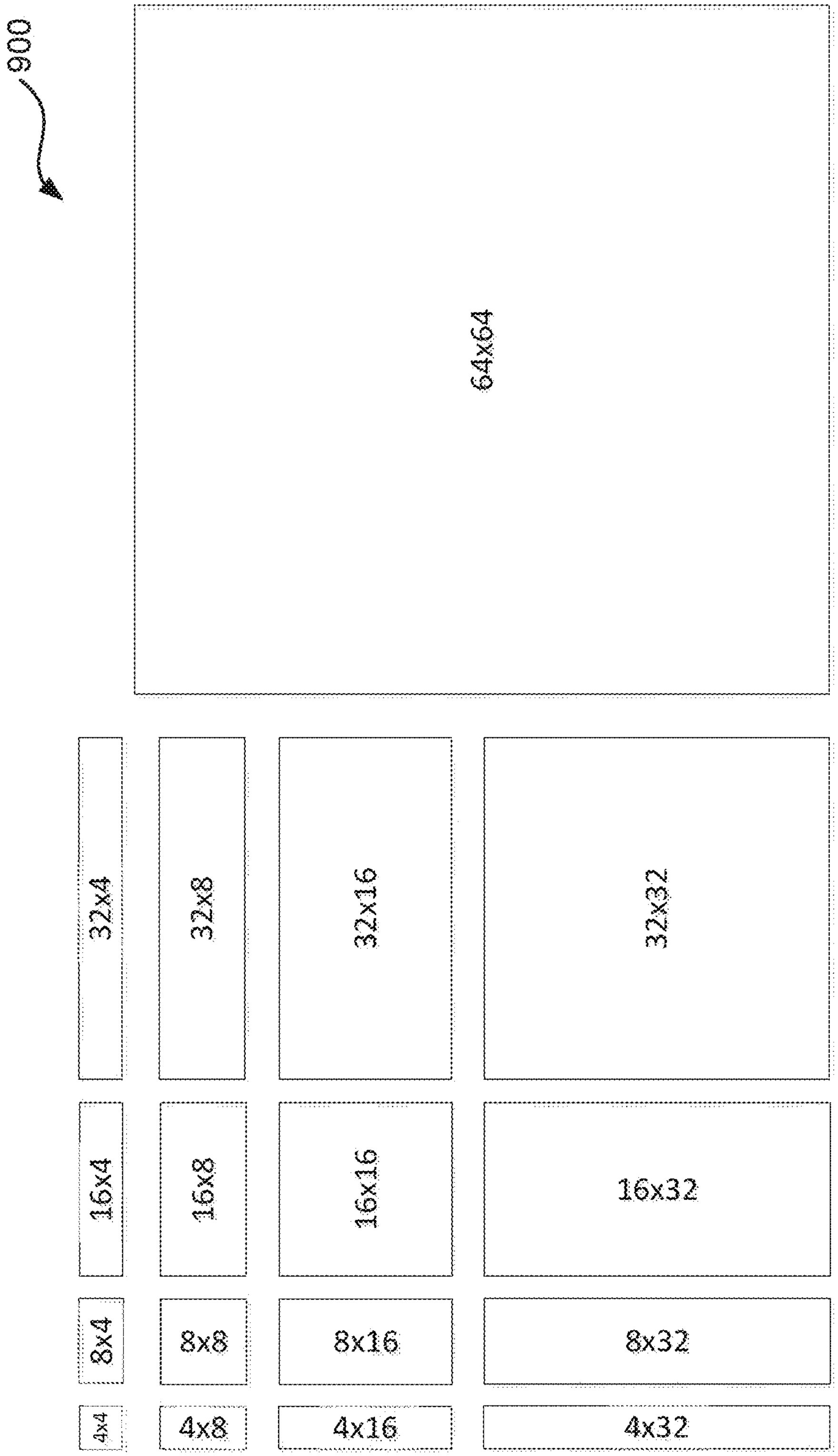
FIG. 9 is a diagram showing transform sizes for the VVC standard.

FIG. 9 shows a collection 900 of supported transform sizes of the VVC standard for the luma channel. The supported transform sizes for the luma channel are as follows: 4×4, 4×8, 4×16, 4×32, 8×4, 8×8, 8×16, 8×32, 16×4, 16×8, 16×16, 16×32, 32×4, 32×8, 32×16, 32×32, and 64×64. For a chroma channel using a 4:2:0 chroma format, for each luma transform size a corresponding chroma transform size is available. The chroma transform size has half the width and height of the luma transform size. The two-dimensional (2D) transforms are separable, with either a one-dimensional (1D) DCT-2 transform being performed both horizontally and vertically. Alternatively, a choice between a ID DCT-7 transform and a ID DST-7 transform, controllable independently for the horizontal and vertical stages of the transform can be performed.

In general, one TU is associated with a CU. For each colour channel, one TB is associated with the TU. However when there are no significant coefficients for the transform of a particular colour channel, the TB for the colour channel may be said to be absent. The colour channel is said to be absent as there is no need to perform a transform on an all-zero array of residual coefficients. Although a one-dimensional (1D) transform is typically defined in terms of a matrix multiplication operation, implementations using butterfly steps and lifting steps are typically used for reduced complexity. There are dependencies both within each 1D transform and spanning the 2D block, due to horizontal and vertical stages of application. Accordingly, each residual sample is influenced by each residual coefficient (from the perspective of the inverse transform) and the corresponding relationship exists for the forward transform. The work of performing the forward or inverse transform cannot be divided into sections, for example to transform half a TB and later transform the other half. The computational cost of determining half a TB is almost the same as the cost of determining the entire TB. Accordingly, an architecture determining transforms in sections has considerably higher complexity than one that determines a transform (from the perspective of the processing pipeline) as an 'atomic' (indivisible) operation. In contrast, PUs, when processed in sections, have a cost of each section approximately in proportion to the section size versus the overall PU size, as described below.

To support large CUs that span multiple pipeline processing regions, the data dependencies for the intra prediction and inter prediction cases are considered. For the intra prediction case, a predicted block is generated using spatially neighbouring reference samples and an intra prediction mode. When the CU is larger than the pipeline processing region size, the PU may be determined in multiple parts, such that a prediction pipeline stage operating on pipeline processing regions computes a partial PB (for one region) and determines an additional partial PB (for a subsequent region), the partial PBs collectively forming the entire PB.

For intra predicted blocks, determining a partial PB requires using reference samples for the PB. The reference samples need not be adjacent to the partial PB. For example, a 128×64 PB is divided and processed as two 64×64 partial PBs. The resultant second (rightmost) 64×64 partial PB uses the references samples corresponding to the original (full) 128×64 PB rather than the references samples that would be used were a 64×64 prediction block present at the location of the second 64×64 partial prediction block. Consequently, a pipelined processing architecture operating on a granularity smaller than that of the CTU size is able to perform intra prediction on PBs larger than the pipeline processing region size with the additional cost of buffering extra reference samples for partial PBs. The additional buffering reference samples are a row and column of samples sized according to the width of the CTU but no additional frame-wide line buffers are needed.

For inter predicted blocks, division of a PU into multiple partial PUs is relatively simple as the common information used comprises the motion vector(s) and reference frame index/indices. As such, PUs may span multiple pipeline processing regions and be processed as multiple partial PUs, each partial PU being contained within a separate pipeline processing region. Even if several PUs are spanning multiple pipeline processing stages, the cost of storing the associated motion vectors for use across multiple pipeline processing regions is low. Use of large PUs for inter prediction is highly beneficial for low bit rate applications and especially at higher levels when group-of-picture (GOP) structures such as 'random access' are used. In such group-of-picture structures and particularly in regions of low motion, relatively large PUs may be used. Use of the large PUs encodes a relatively large portion of the overall picture with minimal syntax present in the bitstream.

Figure 10B:
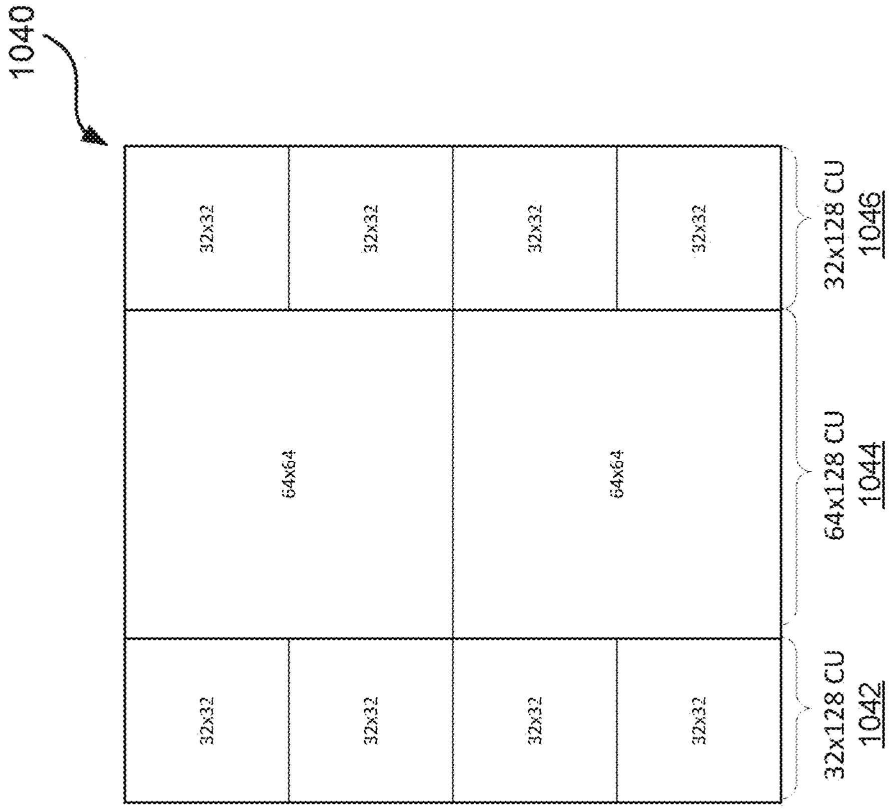
FIG. 10B is a diagram showing alternative transform units associated with the coding tree of FIG. 10A.
Figure 10A:
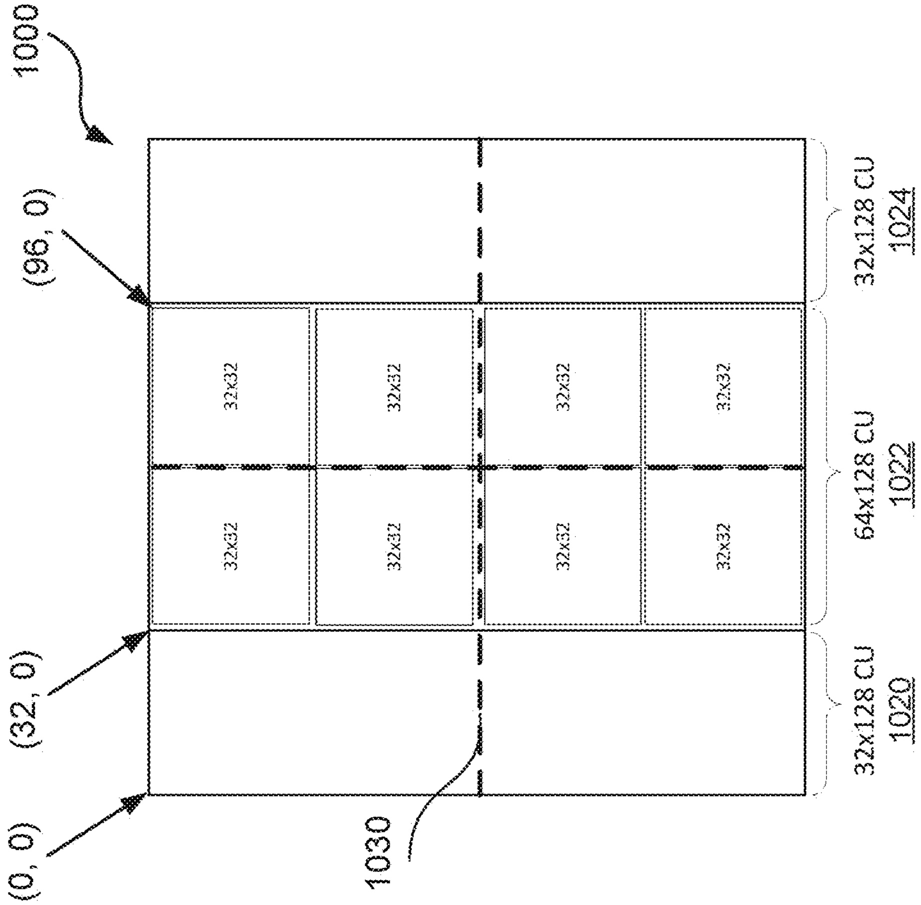
FIG. 10A is a diagram showing coding units of a coding tree unit (CTU) with a ternary split at the top level of the coding tree.

FIG. 10A shows CUs and TUs of a CTU 1000 with a vertical ternary split at the top level of the coding tree, and no further splits. Splitting the coding tree results in three CUs 1020, 1022, and 1024, of size 32×128, 64×128, and 32×128 respectively. The CUs 1020, 1022, and 1024 are located within the CTU at offsets (0, 0), (32, 0), and (96, 0), respectively. For each CU a corresponding PU of the same size exists, and in the CTU 1000 the corresponding PUs span multiple pipeline processing regions. One or more TUs are also associated with each CU. When the CU size is equal to one of the transform sizes, one TU is associated with the CU and has a size equal to a transform of the corresponding size.

FIG. 10B shows a CTU 1040 having an alternative arrangement of TUs associated with the CUS of the coding tree of FIG. 10A. When the CU size is larger than any of the transform sizes, multiple TUs are arranged in a 'tiled' manner to occupy the entirety of the CU. Tiling uses the largest available transform that 'fits' within the CU, given width and height constraints. For example, as shown in FIG. 10B, a 32×128 CU 1042 and a 32×128 CU 1046 use four 32×32 TUs in a tiled manner. A 64×128 CU 1044 uses two 64×64 TUs in a tiled manner, as 64×64 is the largest transform size available for the CU 1044. As described above, splitting the CTU 1040 does not pose an issue with regard to performance for either intra prediction or inter prediction operations. However, the handling of the associated TUs requires accommodation of the pipeline processing region size.

As described with reference to FIG. 9, available transform sizes are limited to a particular set of sizes. Processing of each TB for encoding or decoding is an indivisible operation from the perspective of a pipelined processing architecture. Due to the need to accommodate various placements of CUs in the CTU and the need to perform each transform for a region entirely within one pipeline stage, two approaches are described as follows.

In a first approach, the pipeline processing region is not always a fixed size (e.g. 64×64). Instead, the size of the pipeline processing region is adaptive to the coding tree of each CTU. The first approach accordingly can be termed 'flexible pipeline processing regions'. The term 'flexible pipeline processing regions' is used to distinguish from the case of a fixed size of the regions and thus a fixed grid of pipeline processing regions is present in the image frame, as discussed elsewhere in the present disclosure. In particular, using flexible pipeline processing regions, the CTU 1040 could be processed as follows:

- Region 0: 32×64 (upper half of CU 1042, contains two 32×32 TUs).
- Region 1: 64×64 (upper half of CU 1044, contains one 64×64 TU).
- Region 2: 32×64 (upper half of CU 1046, contains two 32×32 TUs).
- Region 3: 32×64 (lower half of CU 1042, contains two 32×32 TUs).
- Region 4: 64×64 (lower half of CU 1044, contains one 64×64 TU).
- Region 5: 32×64 (lower half of CU 1046, contains two 32×32 TUs).

As such, the arrangement of CUs in the CTU 1040 results in six flexible pipeline processing regions, of sizes 32×64 and 64×64. This is the worst case for the number of flexible pipeline processing regions.

When TUs do not span the flexible pipeline processing region boundaries (e.g. due to a quadtree split, as in the example of FIG. 7A) the number of flexible pipeline processing regions is four and each one has a size of 64×64 luma samples. Although the flexible pipeline processing region approach does enable flexible placement of the TUs in the CTU in a pipelined implementation, the worst case processing rate of the pipeline is increased by 50% for this example compared to an architecture where the pipeline processing regions have a fixed placement over each CTU and hence over the image frame. Although the overall sample rate does not change, in a pipeline architecture the processing rate of individual regions is not necessarily linked only to the region size, so the smaller regions are not necessarily processed at a higher rate commensurate with their smaller size, but at a lower rate owing to overhead of handling each region. Thus, the worst case of the design is higher than for a system where all regions are of the same size. Moreover, as will be described with reference to FIG. 10C, a case where flexible processing regions requires seven regions per CTU also exists, further increasing the worst case region rate of such an architecture.

In the second approach, the relationship between CUs and TUs is changed such that the tiling approach of 'large' CUs (CUs exceeding the width or height of available transforms) is extended. The tiling approach is extended to also be applied to CUs that would otherwise have TUs that span across multiple pipeline processing regions. For example, the CU 1022 is divided into a two by four array of 32×32 TUs. The division of a CU (1022) into smaller TUs is implicit in that the division is determined by virtue of the coding tree and the coding tree's placement of CUs within a CTU without the need for further signalling (for example an additional flag) to be present in the bitstream. Rather, the division can be determined based upon implicit properties of the coding unit itself, being the dimensions of the coding unit. The division of coding unit 1022 enables the following pipelined processing of the CTU 1000 of FIG. 10A:

- Region 0: 64×64 (upper half of CU 1020, upper-left quarter of CU 1022, altogether four 32×32 TUs).
- Region 1: 64×64 (upper-right quarter of CU 1022, upper half of CU 1024, altogether four 32×32 TUs).
- Region 2: 64×64 (lower half of CU 1020, lower-left quarter of CU 1022, altogether four 32×32 TUs).
- Region 3: 64×64 (lower-right quarter of CU 1020, lower half of CU 1022, altogether four 32×32 TUs).

As such, using the second approach, regardless of the coding tree, the 128×128 CTU is always processed using four 64×64 pipeline processing regions. The shape and/or aspect ratio of the of the transform unit is different from the shape or size of the CU. The processing rate of pipeline processing regions is resultantly constant, regardless of the arrangement of CUs within a CTU. In the second approach, the 64×64 TU is only possible for CUs whose top-left location is aligned to a 64×64 grid relative to the top-left corner of the image frame, the required coding unit condition occurs for a CTU with a coding tree having no split operations, that is having a 256×256 CU, or the coding tree having at most one binary split in each of horizontal and vertical directions (giving CUs of size 128×64, 64×128 or 64×64), or a single quad-tree split (giving four CUs, each of size 64×64).

In a third approach, the 64×64 TU is absent from the video encoder 114 and the video decoder 134 and thus is absent from the set of available TU sizes. The 64×64 TU is relatively rarely used. However is the 64×64 TU can be beneficial at very low bitrates, so absence of the 64×64 transform size does impose a compression performance penalty for the VVC standard. However, even with removal of the 64×64 transform, the tiling of TUs when CUs span across multiple pipeline processing regions is still needed. For example, a CTU 10300 shown in FIG. 10E has a coding tree having two vertical ternary splits results. The two vertical ternary splits result in a CU 10320 of size 32×128 oriented vertically along the centre of the CTU. The CU 10320 is located at offset (48, 0) relative to the top-left corner of the CTU 10300. The CU 10320 occupies each of four 64×64 pipeline processing regions and uses relatively small TUs.

Figure 10D:
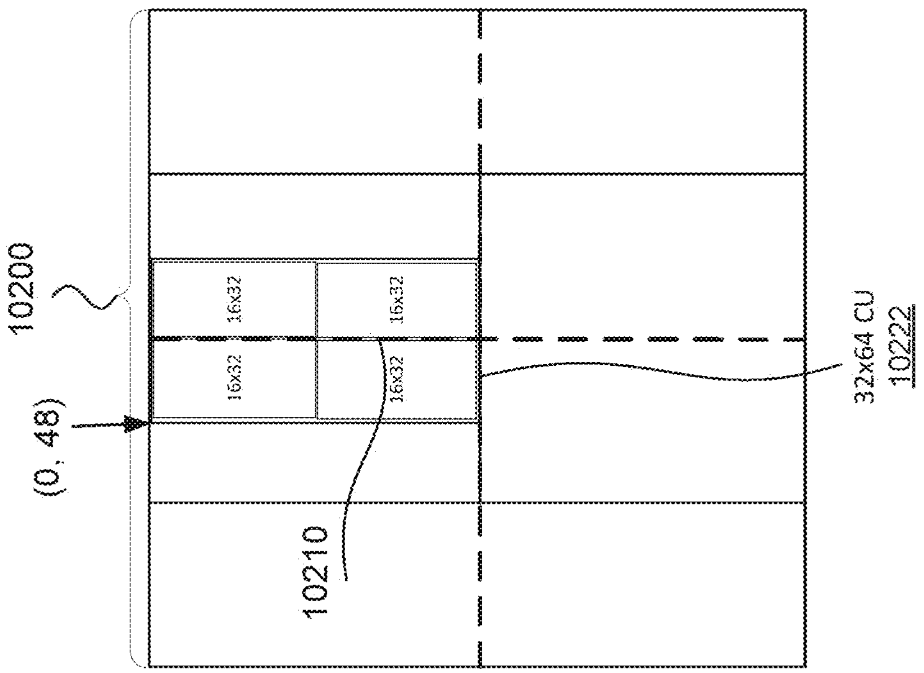
FIG. 10D is a diagram showing transform units associated with a coding tree with a vertical ternary split, a horizontal binary split and a vertical ternary split.
Figure 10C:
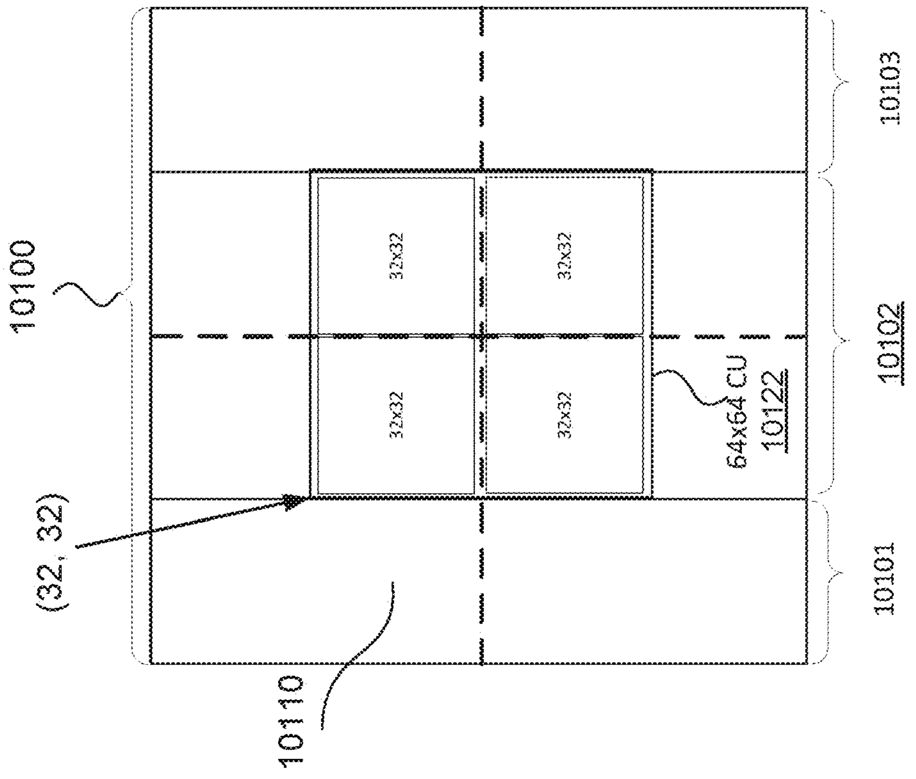
FIG. 10C is a diagram showing transform units associated with a coding tree with two ternary splits in opposing directions.
Figure 10F:
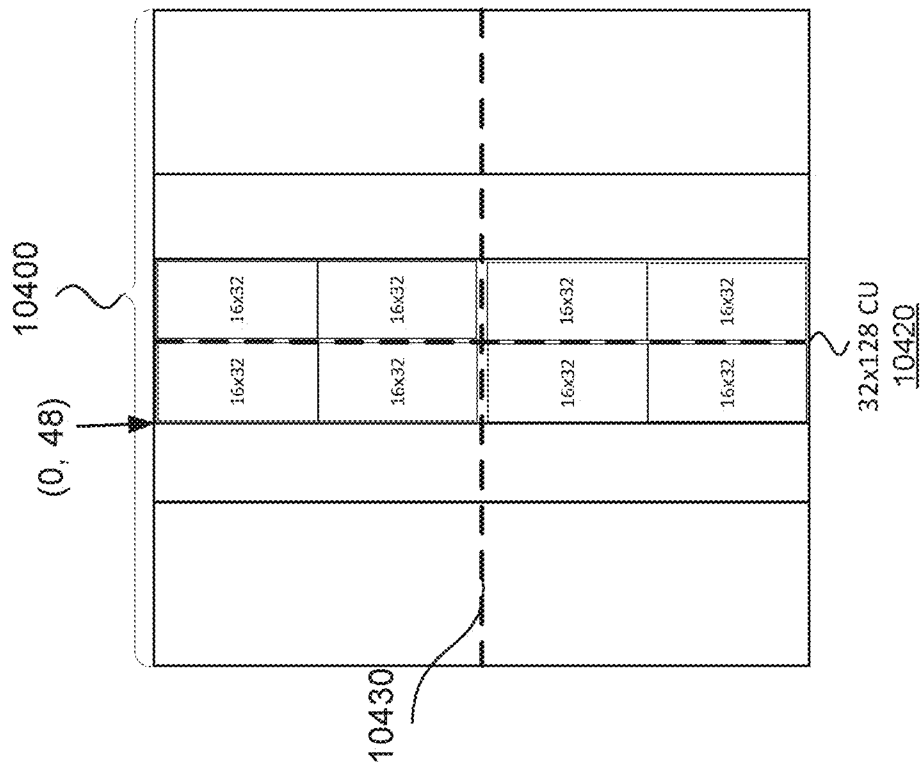
FIG. 10F is a diagram showing alternative transform units associated with a coding tree with two vertical ternary splits to FIG. 10E.
Figure 10E:
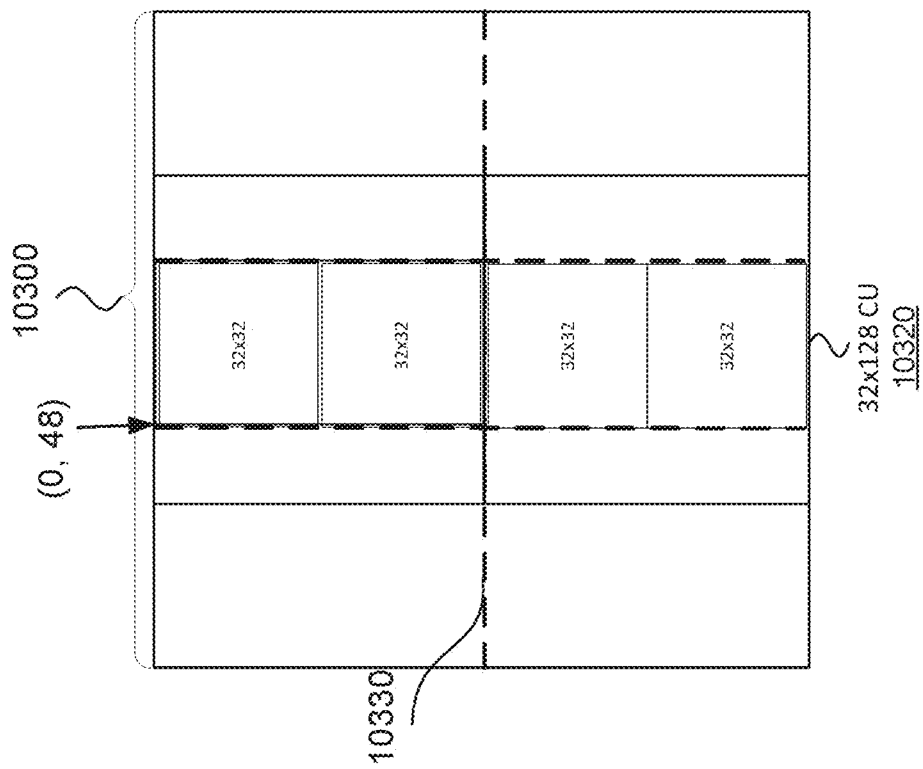
FIG. 10E is a diagram showing transform units associated with a coding tree with two vertical ternary splits.

FIG. 10E shows the CTU 10300 divided into regions according to the (first) approach of flexible pipeline processing regions. The coding tree has two vertical ternary splits that could be accommodated using two additional regions of 32×64 luma samples. Each of the additional regions can contain two 32×32 TUs (arranged overall as a one by four column in the CU 10320), with four regions occupying 48×64 luma samples. The resultant division of the CTU 10320 is shown by region boundaries 10330 in FIG. 10E. In the first approach, the tiling of TUs within a CU is constrained only by the availability of transform sizes. The largest available size is used to tile the CU with TUs.

FIG. 10F shows a CTU 10400. The CTU 10400 relates to the CTU 10300 divided into regions according to the second approach of further tiling TUs. In the example of FIG. 10F, a 32×128 CU 10420 (corresponding to the CU 10320) is associated with a two by four array of 16×32 TUs instead of a one by four array of 32×32 TUs. The two by four array of 16×32 TUs results in each TU being contained within one of four pipeline processing regions of the CTU, as shown by a region boundary 10430. In the example of FIG. 10F, no TU spans across the boundary 10430, meaning no TU overlaps or spans two or more pipeline processing regions. The example of a coding tree having two vertical ternary splits shows that various coding trees are possible that result in division of a CU into multiple TUs to avoid TUs spanning multiple pipeline processing regions. Moreover, the example cases are not limited to those involving the 64×64 TU. In the (second) approach, the tiling of TUs within a CU is further constrained by the requirement that each TU does not span across multiple pipeline processing regions. Resultantly, smaller TUs are used than would be used were largest available transform size the constraint on the tiling of TUs within a CU. As a transform is used to decorrelate residual samples across a block of a given size, the use of smaller TUs may be expected to result in lower compression performance. However, for inter-predicted CUs lower compression performance does not occur in some cases. A single transform is efficient at decorrelating residual samples containing values mapping to relatively few basis functions of the transform. A single transform is therefore typically efficient at decorrelating residual sample of the low frequencies, that is those located towards the upper-left corner of the TB in the frequency domain. However, residual samples containing highly discontinuous content, such as computer graphics or text, or containing content concentrated in one portion of the block are poorly decorrelated, since all basis functions span the entirety of the TB.

The case of residual samples being concentrated in one portion of a CU is common for inter predicted blocks and results from differences such as boundaries between foreground and background for example. Generally, use of larger blocks results in improved compression performance, but also results in blocks spanning foreground and background (or other similar boundaries). When the foreground and background have different motion, typically one portion of the CU is predicted well from the reference picture (having residual samples with zero, or close to zero values). In contrast, another portion of the CU is predicted poorly from the reference picture.

One solution is for the video encoder 114 to split the coding tree further, resulting in smaller CUs. Each of the smaller CUs may be assigned different prediction modes to better adapt to the underlying image features. At object boundaries or where occluded areas become visible, a motion search commonly fails to find an adequate inter-predicted CU. Instead intra prediction is typically used. Tiling of TUs within a CU limits the spatial extent of influence of individual residual coefficients to the size of the corresponding TB. As such, use of tiled TUs within a CU can allow selection of a larger CU. The larger CU may be a CU spanning occluded, foreground and/or background objects in an image frame. Then, the further tiling of TUs due to pipeline processing region boundaries may not overly degrade compression performance, and may even offer advantage due to the selection of larger CUs than would otherwise be the case by the video encoder 114.

FIG. 10C shows TUs associated with a coding tree 10100 having two ternary splits in opposing directions. A first ternary split vertically results in three regions, 10101, 10102 and 10103. The middle region 10102 is further ternary split horizontally, resulting in additional regions. In particular, a 64×64 CU 10122 results from the further ternary split in the region 10102. The CU 10122 located at an offset of (32, 32) relative to the top-left corner of the CTU 10100. The CU 10122 spans four pipeline processing regions, as seen from a processing region boundary 10110.

Were a 64×64 transform to be used for the CU 10122, seven processing regions would be required, made up of one region of size 64×64 for the CU 10122 and another six regions (two of size 32×64 and four of size 64×32) to process the remaining regions in the CTU. As a substantial increase beyond the usual four pipeline processing regions occurs, a 64×64 transform size is not suitable for the CU 10122. Accordingly, four 32×32 transforms are used to code the residual for the CU 10122.

FIG. 10D shows TUs associated with a coding tree for a CTU 10200 having two ternary splits in the same direction, with an intermediate binary split in the opposing direction. As a result of the coding tree of the CTU 10200, a CU 10222 of size 32×64 is located at position (0, 48) relative to the top-left corner of the CTU 10200. The CU 10222 spans two pipeline processing regions such that each region includes a 16×64 portion of the CU 10222. Based on the available transform sizes of FIG. 9, the size of 16×32 is used, tiled in a two-by-two manner to occupy the CU 10200. Then, a pipelined implementation can process the CTU in regions delineated as shown by a boundary 10210. Moreover, the pipelined implementation may process the CU 10200 by separately performing processing for the leftmost two transforms of the CU 10222 as part of one region and performing processing for the rightmost two transforms of the CU 10222 as part of another region.

Tiled TUs for intra can perform reconstruction at each TU boundary. Performing reconstruction at each TU boundary increases complexity due to the additional feedback loops within each CU. However, performing reconstruction at each TU boundary does not increase the worst-case complexity as the alternative of selecting smaller CUs would have resulted in feedback loops of the same severity. For inter predicted CUs there are no additional feedback loops.

Figure 11:
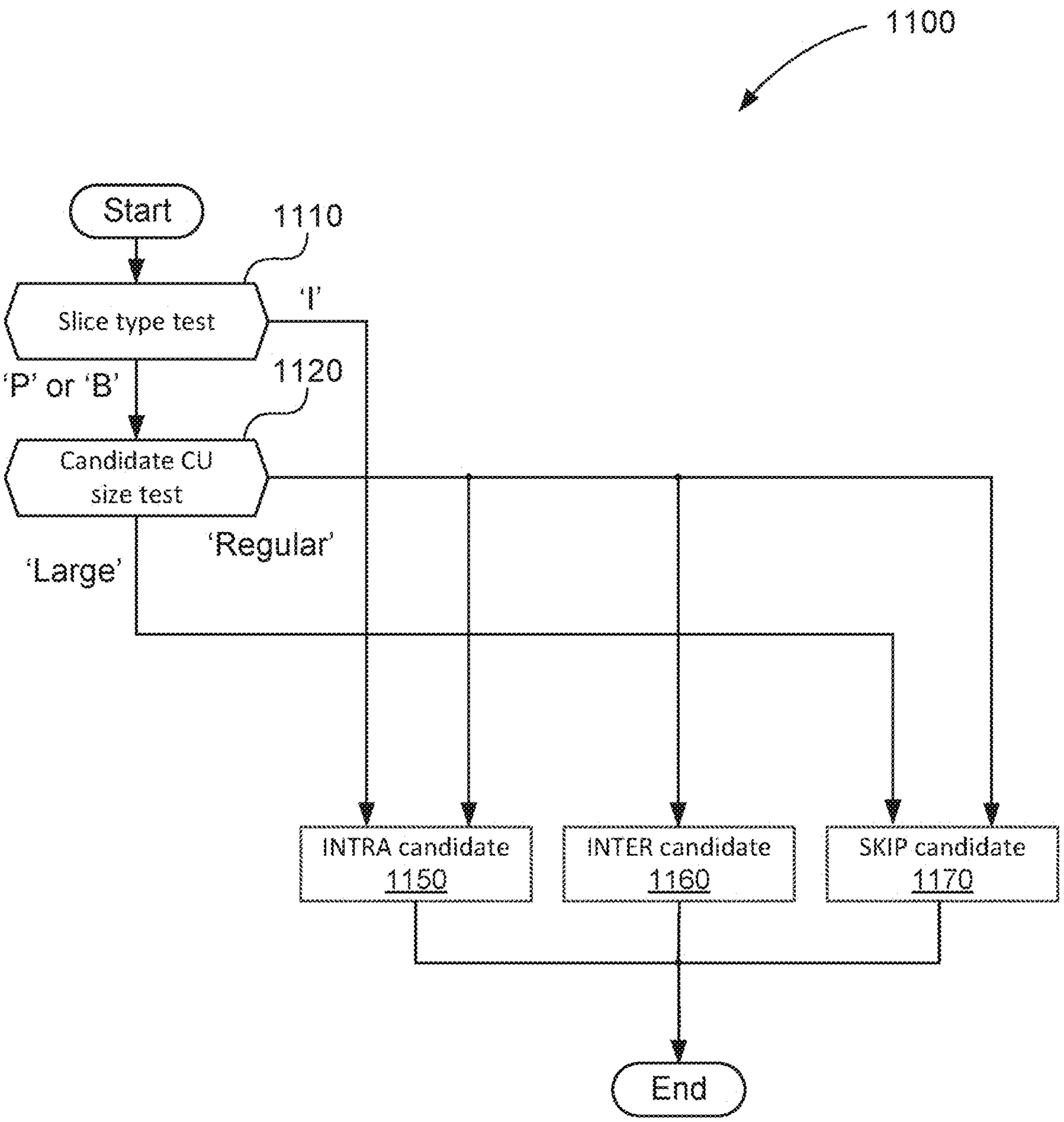
FIG. 11 is a flow chart of a method for determining a prediction mode of a coding unit in a coding tree of a coding tree unit.

FIG. 11 shows a method 1100 for determining a prediction mode of a coding unit in a coding tree of a coding tree unit, The method 1100 enables pipelined implementations of the video encoder 114 and video decoder 134 to be realised. In determining the coding tree of a CTU, the video encoder 114 performs an search to determine a coding tree, as described in relation to FIG. 6. The option for each 'candidate region' of the CTU to contain a CU rather than being further split is tested by the generate leaf node step 622. At step 622, the method 1100 is invoked to generate one or more candidate CUs. Each candidate CU is evaluated and based on comparison of the best candidate CU for a region of the CTU versus further splitting the region. In considering the best candidate CUs resulting from the split, both the coding tree and the prediction modes of the resulting CUs are determined. That is, the 'best' candidate CUs are selected to be used in the bitstream 115. Arrangements of the video encoder 114 and video decoder 134 may restrict the available prediction modes for particular CUs based on aspects such as, for example, CU size and/or temporal layer ID. Restriction affects the determination of the prediction modes. Moreover, the restriction also reduces the necessary prediction mode signalling for the affected CUs, as described with reference to FIGS. 12 and 13, in particular with respect to steps 1222 and 1322. The method 1100 may be embodied by apparatus such as a configured FPGA, an ASIC, or an ASSP. Additionally, the method 1100 may be performed by video encoder 114 under execution of the processor 205. As such, the method 1100 may be stored on computer-readable storage medium and/or in the memory 206. The method 1100, invoked for each candidate region, commences at a slice type test step 1110.

At the slice type test step 1110 the processor 205 tests a slice of the current frame of the video data 113. Generally, the slice type results from a GOP structure, for example, the random access GOP structure of FIG. 8B. If the slice type is an intra ('I') slice, an intra candidate CU 1150 is added for evaluation. If the slice type is an inter ('P' or 'B') slice, the method 1100 progresses from the step 1110 to a candidate CU size test step 1120.

At the candidate CU size test step 1120, the processor 205 tests the size of the CU to determine if the CU should only be able to be coded using skip mode, or if other prediction modes should also be available. If either side length (i.e., the width or the height) of the CU exceeds 64, the step 1120 returns "Large" and a skip mode candidate 1170 is added for evaluation only. Returning a "Large" at step 1120 infers that the CU overlaps a processing region, to be described in relation to step s1210 and 1310. The overlap may be vertical if the CU is a result of a vertical ternary split. The overlap may be vertical if the CU is a result of a vertical ternary split.

As only one mode is added for evaluation for CUs of either size length exceeding 64, it is not necessary to encode or decode a skip flag for CUs of side length exceeding 64. Encoding or decoding a skip flag is not necessary as the size of the CU is sufficient for the video decoder 134 to determine the prediction mode of the CU. Further, for a CTU size of 128×128, coding CUs of size length exceeding 64 as skip only prevents pipeline issues arising for such large CUs. The pipeline issue may still arise for smaller size CUs, as addressed by additional TU tiling within the CU. Although allowing skip coding only for large CUs would seem to limit the flexibility of the video encoder 114 to select prediction modes for CUs, the ability to performing further splitting, resulting in smaller CUs where the larger CU would otherwise by located is available. Moreover, where intra CUs are desirable in P or B slices is likely to be for occluded objects becoming visible in the video sequence, as occluded objects tend to require smaller size CUs to follow the contour of the occluded region. If neither side length of the CU exceeds 64, the step 1120 returns "Regular". Resultantly, each of an intra candidate mode 1150, an inter candidate mode 1160 and the skip mode candidate 1170 are evaluated for the candidate CU.

After evaluation of the candidate prediction modes for the CU, that is evaluation of one or more of 1150, 1160, and 1170, the best mode is selected as the candidate CU. The 'best' candidate prediction mode is selected based lowest rate or distortion cost. By virtue of the traversal of the coding tree as described with reference to FIG. 6, comparison of aggregate costs of CUs resulting from splits with one CU in the containing region enables determination of the coding tree.

In another arrangement of the method 1100, the restriction to only test skip mode for a given CU is restricted to cases where the CU is the result of a ternary split of the CTU. For example, restriction to test mode is made if the CU is of size 32×128, 64×128 (the centre CU of the split, spanning four pipeline processing regions), 128×32, or 128×64 (the centre CU of the split), spanning four pipeline processing regions. Restriction to testing skip mode reduces the number of cases for which the skip mode is inferred, as multiple prediction modes are tested, and the best one signalled for CUs results from a binary split of the CTU. In other words, CUs of size 64×128 or 128×64, none of which result in TUs that span multiple pipeline processing regions are used. The steps 1222 of FIG. 12 and 1322 of FIG. 13, described below, are accordingly varied.

In yet another arrangement of the method 1100, the restriction to only test skip mode is restricted to the centre CU of a ternary split of the CTU. That is, the restriction applies to a 64×128 CU (the centre CU of the split, spanning four pipeline processing regions), or a 128×64 CU (the centre CU of the split), spanning four pipeline processing regions. The steps 1222 of FIG. 12 and 1322 of FIG. 13, described below, are accordingly varied.

FIG. 12 is a flow chart diagram of a method 1200 for encoding the resulting CUs of the coding tree of a CTU into the bitstream 115, with transform sizes selected such that the method may be performed in a pipeline architecture, with pipeline processing regions being smaller in size than the CTU size. In the method 1200, a transform size is selected such that each transform can be processed in its entirety within a region defined according to a processing grid. The method 1200 may be embodied by apparatus such as a configured FPGA, an ASIC, or an ASSP. Additionally, the method 1200 may be performed by video encoder 114 under execution of the processor 205. As such, the method 1200 may be stored on computer-readable storage medium and/or in the memory 206. The method 1200 commences with the processor 205 at a determine processing regions step 1210.

At the determine processing regions step 1210 the video encoder 114, under execution of the processor 205, determines a division of the image frame into a grid of equally sized and square-shaped processing regions that occupy the entirety of the image frame. The processing regions define portions of each image frame which have a size smaller than the size of a CTU. For example, with a CTU size of 128×128, the processing region size may be 64×64 or with a CTU size of 64×64 the processing region size may be 32×32. In each of these cases, each CTU is divided into four pipeline processing regions, arranged in a two-by-two array. The processing order of the processing regions is set to a Z-order. Use of a Z-order scan is consistent with the scan order of CUs in a CTU and thus aligned to the order necessary to ensure data dependencies are met when progressing from one pipeline processing region to the next. Step 1210 operates to dividing the image frame into a plurality of equally sized processing regions, each of the equally sized processing regions being a block processed during a single stage of a pipeline encoding the bitstream. Control in the processor 205 progresses from step 1210 to an encode coding tree step 1215.

At the encode coding tree step 1215 the block partitioner 310, under execution of the processor 205, encodes the coding tree for the CTU, as determined by the method 1100, into the bitstream 115. The coding tree decomposes a CTU into one or more CUs according to a series of splits, as described with reference to FIGS. 5 & 6, and using the examples of FIGS. 7A and 7B. In the method 1100, the block partitioner 310 tested many different combinations of splits in order to arrive at a particular coding tree that enables the CTU to be coded with a high compression ratio, while maintaining fidelity of the decoded image, as described with reference to FIG. 3. The method 1100 effectively determines a size of each coding unit (CU) by determining the coding tree. Control in the processor 205 progresses from step 1215 to a select CU step 1220.

At the select CU step 1220 the block partitioner, under execution of the processor 205, one CU of the coding tree of the CTU is selected. When encoding a CU, the step 1220 is performed for each CU in the encoded coding tree of the step 1215. A selected CU has a particular size and location in the image frame, and hence a location relative to the top-left corner of the containing CTU. Thus, the selected CU may be said to occupy a given area within the containing CTU. Control in the processor 205 progresses from step 1220 to a prediction mode test and encode step 1222.

At the prediction mode test and encode step 1222 the processor 205 tests the prediction mode of the selected CU, as determined in the method 1100. If the slice type of the frame is (i) 'P' or 'B', or (ii) if a 'skip flag' (or 'cu_skip_flag') is encoded. The skip flag indicates if the CU is coded using the skip mode. If the CU is not coded using the skip mode, a 'pred_mode' flag is coded, indicating which of inter prediction or intra prediction is used for the CU.

As described in relation to step 1120 of FIG. 11, skip mode can be inferred based upon a size of the CU. Accordingly, for a "large" CU (per step 1120), the CU is greater than or equal to the size than one of the processing regions, and the skip mode is inferred by the implicit size properties of the CU. The CU would effectively overlap a boundary of one of the processing regions. The skip mode is accordingly inferred and the skip flag is not encoded into the bitstream. Rather, the merge index is determined based on the implicit properties of the CU. Alternatively, if inferred skip is based on a ternary split or a centre CU of a ternary split, the merge index is determined based on the implicit properties of the CU, being shape and/or location of the CU. If the skip mode is not inferred, step 1322 determines that the CU is not greater than or equal to the size than one of the processing regions and includes a skip flag. In arrangements with an inferred skip mode, the skip flag is only coded if the CU size is less than a predetermined threshold, as described with reference to step 1120 of FIG. 11. As For example neither side length exceeds 64 samples. Coding of the skip flag may additionally only be coded when the temporal layer ID (for example 853) of the frame is below a predetermined threshold. For example, the threshold for temporal ID may be below the maximum temporal layer of the GOP structure size, such as, below four when the GOP size is sixteen pictures. Arrangements with an inferred skip mode do not need to code the skip flag if a threshold is met (for example CU with either side length being greater than 64) because only the skip code was tested for such cases in the method 1100. Moreover, the step 1222 accords with the method 1100 in that prediction mode information is only coded when more than one prediction mode was tested for the CU, A corresponding reduction in the signalling present in the bitstream 115 and thus higher compression performance can resultantly be achieved.

Different divisions of CUs between 'large' and 'regular' sets are possible, as shown in the following arrangements. Having more CUs in the 'large' set results in fewer instances of TU tiling to resolve the pipeline processing issue, at the cost of affording less flexibility to the video encoder 114 in selecting prediction modes for CUs of these sizes.

In yet another arrangement of the method 1100, the restriction on side length of the CU for which skip mode is inferred (step 1120 returns 'Large') to be used applies to any CU for which both sides are greater than or equal to 64. Requiring both sides to be greater than or equal to 64 results in the set of CUs for which skip inference takes place being: 128×128, 64×128, and 128×64. Step 1222 of FIG. 12 and step 1322 of FIG. 13 are accordingly varied.

In yet another arrangement of the method 1100, the restriction on side length of the CU for which skip mode is inferred (step 1120 returns 'Large') to be used applies to any CU with either side length being greater than 64 results in the set of CUs for which skip inference takes place being: 128×128, 64×128, 128×64, 128×32, 32×128, 64×64. Again, step 1222 of FIG. 12 and step 1322 of FIG. 13 are accordingly varied. The threshold (or boundary) between the 'large' and 'regular' set may be dependent upon the 'operating point' (e.g., the desired bitrate of the bitstream) of the system 100. Instead of having a fixed boundary, the boundary can be signalled in the bitstream 115 as a threshold, allowing the video encoder 115 to select a boundary for the system 100. The boundary can be signalled as a log 2 of the side length and the requirement that 'either' or 'both' sides of the CU must match the signalled boundary for the CU to be deemed in the 'Large' set can also be signalled.

If the prediction mode is determined (or inferred) to be a skip mode (step 1222 returns "SKIP"), control in the processor 205 progresses from step 1222 to a perform motion compensation step 1270. Otherwise, (the prediction mode is inter or intra prediction and step 1222 returns "INTRA or INTER"), control in the processor 205 progresses from step 1222 to an identify processing regions step 1225.

At the identify processing regions step 1225 the processor 205 uses the area of the CU selected at the step 1220 to identify which processing region(s) overlap the selected CU. For example, the CU 1022 of FIG. 10A overlaps four 64×64 processing regions in the CTU 1000. Control in the processor 205 progresses from step 1225 to a determine CU transform size constraint step 1230.

At the determine CU transform size constraint step 1230 the processor 205 determines an initial transform size for the CU. The initial transform size is set as the largest transform size of a predetermined set of transform sizes, such as those of FIG. 9, having a width not exceeding the width of the selected CU and a height not exceeding the height of the selected CU. Thus, the initial transform size is the largest size which 'fits' into the selected CU. Considering the luma channel, typically a single transform occupies the entirety of the CU. Chroma channels have a similar relationship, with chroma transform sizes corresponding to those of the luma channel adjusted for the 4:2:0 chroma format, that is a halving of the width and height of each transform.

In cases where a single transform does not fully occupy the CU, the initial transform size is applied using a 'tiling' process to occupy the entirety of the CU with transforms at step 1230. For example, for the CU 1020, which has a size of 32×128, the initial transform size of 32×32 with a one-by-four tiling is needed to occupy the entirety of the CU. For the CU 1022, which has a size of 64×128, the initial transform size is 64×64 with a one-by-two filing to occupy the entirety of the CU. Control in the processor 205 progresses from step 1230 to a processing region boundary overlap test step 1235.

At the processing region boundary overlap test step 1235 the processor 205 determines if any transform of the initial transform size and associated with the selected CU spans (or 'straddles' the boundary of) two or more processing regions. In other words, at the step 1235 the processor 205 determines if the coding unit overlaps a boundary between processing regions. For example, with an initial transform size of 32×32 for the CU 1020, located at position (0, 0) relative to the top-left corner of the CTU 1000, each transform is fully contained within a 64×64 pipeline processing region. The top two 32×32 transforms are located in one processing region and the bottom two 32×32 transforms are located in another processing region. In such a case, the step 1235 returns "No" and control in the processor 205 progresses to a CU transform size step 1240.

However, for the CU 1022 with an initial transform size of 64×64 and located at position (32, 0) relative to the top-left corner of the CTU 1000, the initial transform size occupies an area from (32, 0) to (95, 64). As the processing regions are aligned to a 64×64 grid, the initial first transform occupies two processing regions and the second transform, which occupies an area from (32, 64) to (95, 127) occupies another two processing regions. As at least one (both in the example of FIG. 10A) of these proposed initial transforms that would result spans the boundary between two or more processing regions, step 1235 returns "Yes" and control in the processor 205 progresses from step 1240 to a processing region transform size step 1245.

As a general rule, the possibility of a transform to span two or more processing regions results from application of a ternary split at the top level of the coding tree. The result is due to the CTU size, the processing region size, the side dimensions of transforms all being powers of two, and the CTU size being twice the width and height of the processing region size. Accordingly, only a ternary split at the top level of the coding tree can produce CUs offset spatially (horizontally or vertically) by half the width or height of a processing region. The offset CUs, when using transforms of the initial transform size, may result in transforms that would span two or more processing regions, creating a substantial implementation challenge for a pipelined architecture operating at the granularity of a processing region.

Given the relationship between the CTU size, the processing region size, and the transform side dimension sizes, one solution could be to prohibit a ternary split of a region in the coding tree with a side length exceeding 64 samples. The remaining options for regions with a side length exceeding 64 samples are no further splitting, a binary split or a quadtree split. If no further splitting were performed, tiling of four 64×64 transforms would be possible with each one fully contained within a pipeline processing region. If a binary split of the 128×128 CTU were performed in either direction, prohibition of a ternary split in the opposing direction in the resulting sub-regions would prevent a possible 64×64 CU spanning two pipeline processing regions. However, further splitting the middle (64×64) CU of the ternary split can resolve the transform placement issue with respect to pipeline processing. The initial prohibition would prevent middle coding trees being searched. If a binary split were performed in either direction (resulting in two regions either of size 64×128 or of size 128×64), it would also not be possible to apply a ternary split of either resulting region in same direction, due to one side length being 128.

However, a ternary split in the same direction would not result in any transforms spanning the boundary between pipeline processing regions. For example, a horizontal ternary split of a 128×64 region (resulting from a horizontal binary split of the CTU) would result in a 16×128, a 32×128, and another 16×128 region. Along the side length of 128, generally transforms of side length 32 would be used, tiled four times and not resulting in any transform spanning multiple pipeline processing regions. Finally, if a quadtree split were performed, then each resulting region would be within a separate pipeline processing region, and no further pipeline processing issues would result, regardless of subsequent splitting.

Accordingly, although prohibiting a ternary split on any region with a side length exceeding 64 is one approach to resolve pipeline processing performance, the prohibition does prohibit potentially useful block sizes, reducing compression performance. Also, the restriction prevents use of 'skip mode' inter predicted CUs, which in having no residual coefficients do not cause pipeline processing regions due to transform placement. The restriction therefore adversely affects compression performance, as flexible placement of skip mode CUs, for example for large CUs, is desirable especially at low bit rates.

As described, the testing of the step 1235 is performed based on CU size and location within the CTU. The step 1235 thus implements an implicit test, not increasing the 'search space' of the video encoder 114. That is, the video encoder 114 is not given an additional degree of freedom (for example, addition of a flag) in deciding the TU configuration. The absence of an additional degree of freedom in deciding the TU configuration means that there is no need for additional signalling in the bitstream 115 to store the result of the degree of freedom. In other words, the operation of the step 1235 is implicitly based on properties the coding tree of the CTU. The output of step 1235 is independent of, and does not relate to generation of, an explicit signal regarding TU size to be encoded in the bitstream.

At the CU transform size step 1240 the processor 205 selects the transform size for the CU to be the determined CU transform size of the step 1230. Since no resulting TUs span multiple pipeline processing regions, there is no need to further divide the CU into additional TUs. Control in the processor 205 progresses from step 1240 to an apply forward transforms and quantise step 1250.

At the processing region transform size step 1245 the processor 205 determines a transform size for the selected CU, such that none of the resulting transforms span two or more of the pipeline processing region for which the selected CU spans. For example, the CU 1022 of size 64×128 is located at (32, 0) relative to the top-left of the containing CTU 1000. As such, the CU 1022 spans a region from (32, 0) to (95, 127). Horizontally, the CU passes the pipeline processing region at X offset of 64. Therefore, horizontally, the TU width needs to be at most 32, to be the largest TU width suitable for a pipelined implementation. Vertically, the TU width needs to be at most 64, to be the largest TU width suitable for a pipelined implementation.

However, as seen in FIG. 9, there is no 32×64 TU available. The largest available TU that can be used is 32×32, so the 32×32 size TU is selected. With selection of a 32×32 TU for the CTU 1000, the CTU may be processed in a pipelined manner as described with reference to FIG. 10A. Step 1245 effectively operates to select a transform size for the coding unit from the available collection (plurality) of transform sizes, for example as shown at FIG. 9. The transform size is selected to fit within the coding unit and can be different to a size of the processing region. Control in the processor 205 progresses from step 1245 to the apply forward transforms and quantise step 1250.

At the apply forward transforms and quantise step 1250 the transform module 326 and the quantiser module 334, under execution of the processor 205, apply the selected transform of either the step 1240 or the step 1245 to transform the difference 324 and produce residual coefficients 336. If the CU size is equal to the transform size, a single transform is performed. If the CU size is larger than the transform size, the transform is applied in a tiled manner so that all of the difference 324 is transformed. Moreover, by virtue of the transform size selected at the step 1245, individual transforms do not cover regions that span across two or more of the pipeline processing regions.

A software implementation such as a 'reference software' for a video compression standard would generally process each frame one CTU at a time, without using a finer granularity of processing, such as pipelined processing of regions smaller than the CTU size. Reference software implementations do not encounter issues such as the above-identified pipeline processing region issue as they typically do not run in real time or in resource-constrained devices. Practical implementations, particularly hardware implementations utilising a pipeline architecture but also some software implementations, benefit from transforms being contained entirely within distinct pipeline processing regions. Software implementations that benefit from transforms being contained entirely within distinct pipelining regions include multi core implementations that use the same pipeline architecture for improved locality, or example. An important benefit transforms being contained entirely within distinct pipelining regions is a uniform size and rate of the pipeline processing regions. Control in the processor 205 progresses from step 1250 to an encode residual coefficients step 1255.

At the encode residual coefficients step 1255 the entropy encoder 338, under execution of the processor 205, encodes the residual coefficients of the step 1250 into the bitstream 115. Firstly, a 'root coded block flag' is coded indicating the presence of at least one significant residual coefficient resulting from the quantisation of the step 1250. The root coded block flag is coded once for the CU and signals significance for any of the transforms of the CU, across all colour channels for any TB of any TU of the CU. Provided at least one significant residual coefficient is present for any transform across any colour channel of the CU, within each colour channel a separate coded block flag is coded for each transform applied in the colour channel. Each coded block flag indicates the presence of at least one significant residual coefficient in the corresponding transform block. For transforms with at least one significant residual coefficient, a significance map and magnitudes and signs of significant coefficients are also coded. Control in the processor 205 progresses from step 1255 to a intra mode test 1260.

At the intra mode test 1260 the prediction mode of the selected CU is tested by the processor 205. If the prediction mode is intra prediction ("Yes" at step 1260), control in the processor 205 progresses to a perform intra prediction step 1265. Otherwise (the prediction mode is inter prediction and step 1260 returns "No:), control in the processor 205 progresses to the perform motion compensation step 1270.

At the perform intra prediction step 1265 the intra-frame prediction module 364, under execution of the processor 205, generates an intra predicted block of samples (366). The intra predicted block of samples 366 is generated using filtered reference samples 362 according to an intra prediction mode for each PB of the selected CU. When multiple TUs are associated with the CU due to the step 1245, the intra reconstruction process is applied at each TU boundary internal to the selected CU. The reference sample cache 356 is updated with the reconstructed samples at each TU boundary inside the CU, in addition to the reconstructed samples at each CU boundary. Reconstruction at TU boundaries inside the CU allows the residual coefficients of TUs above or left of a current TU inside the CU to contribute to the reference samples for generating the part of the PB collocated with the current TU. Reconstruction at TU boundaries inside the CU can therefore reduce distortion and improve compression efficiency. Control in the processor 205 progresses from the step 1265 to a reconstruct CU step 1275.

At the perform motion compensation step 1270 the motion compensation module 380, under execution of the processor 205, produces the filtered block samples 382. The filtered block samples 382 are produced by fetching one or two blocks of samples 374 from the frame buffer 372. For each block of samples, the frame is selected according to a reference picture index and the spatial displacement in pixels relative to the selected CU is specified according to a motion vector. For each block of samples fetched from the frame buffer 372, filtering is applied according to a 'sub-pixel' displacement portion of the motion vector. The precision of the sub-pixel displacement portion of the motion vector can be one-quarter pel precision or one-sixteenth pel precision. Where two blocks are used, the resulting filtered blocks are blended together. The reference picture indices and motion vector(s) are determined in the method 1100. Control in the processor 205 progresses from the step 1270 to the reconstruct CU step 1275.

At the reconstruct CU step 1275 the summation module 352, under execution of the processor 205, produces the reconstructed samples 354 by adding the residual samples 350 and the PU 320 for inter-predicted or intra-predicted CUs. For skip mode CUs there are no residual samples and so the reconstructed samples 354 are derived from the PU 320. The reconstructed samples 354 are available for reference by subsequent intra predicted CUs in the current frame. The reconstructed samples 354 are written to the frame buffer 372, after in-loop filtering is applied (that is, application of the in-loop filters 368), for reference by inter predicted CUs in subsequent frames. The deblocking filtering of the in-loop filters 368 is applied to the interior boundaries of the CU. That is, the deblocking filtering is applied to boundaries between TUs inside the CU, resulting from tiling due both the CU size and due to pipeline processing region boundaries. Control in the processor 205 progresses from step 1275 to a last CU test step 1285.

At the last CU test step 1285 the processor tests if the selected CU is the last one in the CTU. If not ("No" at step 1160), control in the processor 205 returns to the step 1215. If the selected CU is the last one in the CTU in the CU scan order, that is a depth-first Z-order scan, the method 1200 terminates. After the method 1200 terminates, either the next CTU is encoded, or the video encoder 114 progresses to the next image frame of the video.

FIG. 13 shows a method 1300 for decoding the CUs of a CTU from a bitstream 133. In the method 1300, transform sizes are selected such that the method 1300 may be performed in a pipelined architecture. The corresponding pipeline processing regions are smaller in size than the CTU size and the rate of pipeline processing regions is independent on the coding tree of each CTU. The method 1300 may be embodied by apparatus such as a configured FPGA, an ASIC, or an ASSP. Additionally, the method 1300 may be performed by video decoder 134 under execution of the processor 205. As such, the method 1300 may be stored on computer-readable storage medium and/or in the memory 206. The method 1300 commences with the processor 205 at a determine processing regions step 1310.

At the determine processing regions step 1310 the video decoder 134, under execution of the processor 205, determines a division of the image frame of the bitstream into a grid of equally sized and square-shaped processing regions that occupy the entirety of the image frame. The step 1310 determines the division of the image frame in a manner matching that of the step 1210. Step 1310 operates to divide the image frame into a plurality of equally sized processing regions, each of the equally sized processing regions being a block processed during a single stage of a pipeline decoding the bitstream. Control in the processor 205 progresses from step 1310 to a decode coding tree step 1315.

At the decode coding tree step 1315 the entropy decoder 420, under execution of the processor 205, decodes a coding tree for the CTU from the bitstream 133. The coding tree decomposes a CTU into one or more CUs according to a series of splits, as described with reference to FIGS. 5 & 6, and using the example of FIGS. 7A and 7B. The coded tree decoded from the bitstream 133 is the coding tree determined at the step 1215 of FIG. 12. Step 1315 effectively determines a size of each coding unit (CU) by decoding the CTU using the coding tree. Control in the processor 205 progresses from step 1315 to a select CU step 1320.

At the select CU step 1320 the video decoder 134, under execution of the processor 205, selects one CU of the decoded coding tree according to an iteration through the coding tree in a forward direction corresponding to the direction in which syntax associated with the coding tree is present in the bitstream 134. The forward direction relates to a Z-order scan. The selected CU has a particular size and location in the image frame, and hence a location relative to the top-left corner of the containing CTU. Thus, the selected CU may be said to occupy a given area within the containing CTU. Control in the processor 205 progresses from step 1320 to a determine prediction mode test step 1322.

At the determine prediction mode test step 1322 the processor 205 determines the prediction mode of the selected CU. If the slice type of the frame is 'P' or 'B', the entropy decoder 420 decodes a 'skip flag' (or 'cu_skip_flag') indicating if the CU is coded using the skip mode. If the CU is not coded using the skip mode, the entropy decoder 420 decodes a 'pred_mode' flag. The 'pred_mode' flag indicates which of inter prediction or intra prediction is used for the CU. As described in relation to step 1120 of FIG. 11, skip mode can be inferred based upon a size of the CU. Accordingly, for a "large" CU (per step 1120), the CU is greater than or equal to the size than one of the processing regions, and the skip mode is inferred by the implicit size properties of the CU. The skip mode is accordingly inferred and the skip flag is not encoded into the bitstream. Rather, the merge index is determined based on the implicit properties of the CU. Alternatively, if inferred skip is based on a ternary split or a centre CU of a ternary split, the merge index is determined based on the implicit properties of the CU, being shape and/or location of the CU. If the skip mode is not inferred, step 1322 determines that the CU is not greater than or equal to the size than one of the processing regions and includes a skip flag.

In arrangements with an inferred skip mode, the skip flag is only decoded if the CU size is less than a predetermined threshold, for example if neither side length exceeds 64 samples. Otherwise, the CU is determined to be a 'large CU' and the skip mode is inferred as being used. Coding of the skip flag may additionally only be coded when the temporal layer ID is below a predetermined threshold, for example, below the maximum temporal layer of the GOP structure size, for example, below four when the GOP size is sixteen pictures. Arrangements with an inferred skip mode do not need to decode the skip flag i if a threshold test is satisfied (for example large CU size and/or temporal layer ID above a threshold) because only the skip code was tested for such cases in the method 1100. Thus the prediction mode is determined to be skip mode. Moreover, the step 1322 accords with the method 1100 in that prediction mode information is only decoded when more than one prediction mode was tested for the CU. When only one prediction mode was tested for the CU, the video decoder 134 infers the prediction mode on the basis of, for example, the CU size, rather than explicitly decoding a prediction mode.

If the prediction mode is determined (or inferred) to be a skip mode ("SKIP" at step 1322), control in the processor 205 progresses from step 1322 to a decode motion parameters step 1370. Otherwise (the prediction mode is inter or intra prediction), step 1322 returns "INTRA or INTER" and control in the processor 205 progresses to an identify processing regions step 1325.

At the identify processing regions step 1325 the processor 205 uses the area of the CU selected at the step 1320 to identify which processing region(s) overlap the selected CU. For example, the coding unit 1022 of FIG. 10A overlaps four 64×64 processing regions in the CTU 1000. Step 1325 operates in a similar manner to step 1225 of FIG. 12. Control in the processor 205 progresses from step 1325 to a determine coding unit transform size constraint step 1330.

At the determine coding unit transform size constraint step 1330 the processor 205 determines an initial transform size for the CU. The initial transform size is set in with a similar manner to the determining of the step 1230. Control in the processor 205 progresses from step 1330 to a processing region boundary overlap test step 1335.

At the processing region boundary overlap test step 1335 the processor 205 determines if any transform of the initial transform size and associated with the selected CU spans two or more processing regions, similarly to the overlap test step 1235. In other words, step 1335 determines if the coding unit overlaps a boundary between processing regions. If each transform is fully contained within a processing region ("No" at step 1335) control in the processor 205 progresses to a CU transform size step 1340. If at least one of the transforms that would result from the initial transform size spans, or 'straddles', the boundary between two or more processing regions ("Yes" at step 1335), control in the processor 205 progresses to a processing region transform size step 1345. The result of the test step 1335 depends on the CU size and location within the CTU, which are fully described by the coding tree of the CTU. As such, there is no additional signalling required to be decoded from the bitstream 133 in order to determine if the CU spans two processing regions or not. Rather, implicit properties (size and location) of the CU are used to test if processing region boundaries are overlapped.

At the CU transform size step 1340 the processor 205 selects the transform size for the CU to be the determined CU transform size of the step 1330, in accordance with the transform size selection of the step 1240. Control in the processor 205 progresses from step 1350 to a decode residual coefficients step 1350.

At the processing region transform size step 1345 the processor 205 determines a transform size for the selected CU, such that none of the resulting transforms span two or more of the pipeline processing region for which the selected CU spans. The step 1345 operates in accordance with the transform size selection of the step 1245. Step 1345 effectively operates to select a transform size for the coding unit from the available collection (plurality) of transform sizes, for example as shown at FIG. 9. The transform size is selected to fit within the coding unit and can be different to a size of the processing region. Control in the processor 205 progresses from step 1345 to the decode residual coefficients step 1350.

At the decode residual coefficients step 1350 the entropy decoder 420, under execution of the processor 205, decodes residual coefficients from the bitstream 115. The coding unit by applying the inverse transform to residual coefficients of each transform unit in the coding unit. In decoding residual coefficients, a 'root coded block flag' is firstly decoded. The root coded block flag indicates the presence of at least one significant residual coefficient in any TU of the CU, that is across all colour channels. When the root coded block flag indicates significant residual coefficients are present in the CU, within each colour channel a separate coded block flag is decoded for each transform applied in the colour channel. Each coded block flag indicates the presence of at least one significant residual coefficient in the corresponding transform. For transforms with at least one significant residual coefficient, a significance map and magnitudes and signs of significant coefficients are also decoded. Control in the processor 205 progresses from step 1350 to an inverse quantise and apply inverse transforms step 1355.

At the inverse quantise and apply inverse transforms step 1355 the dequantiser module 428 and the inverse transform module 444, under execution of the processor 205, inverse quantise residual coefficients to produce scaled transform coefficients 440. At step 1355 the selected transform of either the step 1340 or the step 1345 is applied to transform the scaled transform coefficients 440 to produce residual samples 448. As with the step 1250, application of the transform is performed in a tiled manner according to the determined transform size. Moreover, by virtue of the transform size selected at the step 1345, individual transforms do not cover regions that span across two or more of the pipeline processing regions. As with the method 1200, practical implementations, particularly hardware implementations utilising a pipeline architecture but also some software implementations, benefit from transforms being contained entirely within distinct pipeline processing regions. An example software implementation that benefits for the arrangements described is a multi-core implementation that may use the same pipeline architecture for improved data locality. Control in the processor 205 progresses from step 1355 to an intra mode test step 1360.

At the intra mode test 1360 the determined prediction mode of the selected CU is tested by the processor 205. If the prediction mode is intra prediction ("Yes" at step 1360), control in the processor 205 progresses to a perform intra prediction step 1365. Otherwise (the prediction mode is inter prediction), step 1360 returns "No" and control in the processor 205 progresses to the decode motion parameters step 1370.

At the perform intra prediction step 1365 the intra-frame prediction module 476, under execution of the processor 205, generates an intra predicted block of samples (480). The intra predicted block of samples 480 is generated using filtered reference samples 472 according to an intra prediction mode for each PB of the selected CU. When multiple TUs are associated with the CU due to the step 1345, the intra reconstruction process is applied at each TU boundary internal to the selected CU. The reconstructed sample cache 460 is updated with the reconstructed samples at each TU boundary inside the CU, in addition to the reconstructed samples at each CU boundary. Reconstruction at TU boundaries inside the CU allows the residual of TUs above or left of a current TU inside the CU to contribute to the reference samples for generating the part of the PB collocated with the current TU. Reconstruction at TU boundaries inside the CU can operate to reduce distortion and improve compression efficiency. Control in the processor 205 progresses from the step 1365 to a reconstruct CU step 1380.

At the decode motion parameters step 1370 the entropy decoder 420, under execution of the processor 205, decodes the motion vector(s) for the selected CU. Decoding the motion vector comprises selecting a motion vector by (i) decoding a merge index if skip mode was inferred (identified from properties of the CU as at 1120 and 1322), or (ii) decoding a skip flag to decode that the merge index if skip mode was not inferred by the CU. A list of candidate motion vectors is created (referred to as a 'merge list') using spatially and temporally neighbouring blocks. A merge index is decoded from the bitstream 133 to select one of the candidates from the merge list. The merge index may be determined based upon implicit properties of the CU (as described in relation to step 1322 above) or from decoding a split mode flag from the bitstream. If the selected CU is coded using skip mode, the selected candidate becomes the motion vector for the CU. If the selected CU is coded using inter prediction, a motion vector delta is decoded from the bitstream 133 and added to the candidate that was selected according to the decoded merge index. Control in the processor progresses from the step 1370 to a perform motion compensation step 1375.

At the perform motion compensation step 1375 the motion compensation module 434, under execution of the processor 205, produces the filtered block samples 438. The filtered block samples 438 are produced by fetching one or two blocks of samples 498 from the frame buffer 496. For each block of samples 498, the frame is selected according to a reference picture index and the spatial displacement in pixels relative to the selected CU is specified according to a motion vector. For each block of samples fetched from the frame buffer 372, filtering is applied according to a 'sub-pixel' displacement portion of the motion vector. The precision of the sub-pixel displacement portion of the motion vector can be one-quarter pel precision or one-sixteenth pel precision. Where two blocks are used, the resulting filtered blocks are blended together. The reference picture indices and motion vector(s) are decoded from the bitstream 133 and were determined in the method 1100. Control in the processor 205 progresses from the step 1375 to the reconstruct CU step 1380.

At the reconstruct CU step 1380 the summation module 450, under execution of the processor 205, produces the reconstructed samples 456. The reconstructed samples 456 are produced by adding the residual samples 448 and the PU 452 for inter-predicted or intra-predicted CUs. For skip mode CUs there is no residual and so the reconstructed samples 456 are derived from the PU 452. The reconstructed samples 456 are available for reference by subsequent intra predicted CUs in the current frame. The reconstructed samples 456 are written to the frame buffer 496, after in-loop filtering is applied (that is, application of the in-loop filters 488), for reference by inter predicted CUs in subsequent frames. The deblocking filtering of the in-loop filters 488 is applied to the interior boundaries of the CU. That is, the deblocking filtering is applied to the boundaries between TUs inside the CU, resulting from tiling due both the CU size and due to pipeline processing region boundaries. Control in the processor 205 progresses from step 1380 to a last CU test step 1385.

At the last CU test step 1385 the processor 205 tests if the selected CU is the last CU in the CTU in the CU scan order, being a depth-first Z-order scan. If not ("No" at step 1385), control in the processor 205 returns to the step 1315. If the selected CU is the last CU in the CTU ("Yes" at step 1385) the method 1300 terminates. After the method 1300 terminates, either the next CTU is decoded, or the video decoder 134 progresses to the next image frame of the bitstream.

In an alternative arrangement of the video encoder 114 and the video decoder 134, CUs spanning multiple pipeline processing regions are inferred to be coded in 'skip mode' and thus do not have any associated residual coefficients and hence there is no need to perform a transform to encode or decode such blocks. As such, when the video encoder 114 is determining the coding tree at the step 1215, when testing such CUs that would result in TUs spanning multiple processing regions, it is required that they be coded without any associated residual coefficients.

INDUSTRIAL APPLICABILITY

The arrangements described are applicable to the computer and data processing industries and particularly for the digital signal processing for the encoding a decoding of signals such as video and image signals, achieving high compression efficiency without excessive cost in terms of memory consumption, silicon area due to affording the possibility of pipelined implementations with a processing region size smaller than the largest supported block size, or CTU size. In some implementations, the arrangements described are useful for the VVC standard, as implementing tiling of the region TUs (as implemented at steps 1145 and 1245 for example) assists in preventing pipeline inefficiencies, particularly for inter prediction mode. As identified above, some of the implementations described herein allow ternary coding trees to be used for larger CUs, or 64×64 CUs to be used with decreased impact on processing time and/or quality.

The foregoing describes only some embodiments of the present invention, and modifications and/or changes can be made thereto without departing from the scope and spirit of the invention, the embodiments being illustrative and not restrictive.

(Australia only) In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method for decoding a coding unit from a bitstream according to a predetermined manner, comprising:

decoding information from the bitstream for determining the coding unit in a coding tree unit, determining the coding unit based on the information, determining a transform unit in the coding unit, and decoding the coding unit using the transform unit, wherein in the predetermined manner, a length of a side of the coding unit can be 128 samples, wherein, when a first constraint regarding a size of the transform unit is used to determine the transform unit, a maximum size selectable for luminance component of the transform unit in the coding unit is 32 samples which is one-fourth of 128 samples even if at least one side of the coding unit is 128 samples, wherein, a shape in which one side of a horizontal side and a vertical side is longer than other side is capable of being used as a shape of a transform unit in the predetermined manner, wherein the coding unit can be determined by dividing the coding tree unit using a ternary split, wherein a size of the coding tree unit is 128 samples by 128 samples, and wherein, when the coding unit spans a plurality of regions of 64 samples by 64 samples in the coding tree unit:

a first transform unit of a plurality of transform units in the coding unit is included in a first region of the plurality of regions of 64 samples by 64 samples;

a second transform unit, different from the first transform unit, of the plurality of transform units in the coding unit is included in a second region, different from the first region, of the plurality of regions of 64 samples by 64 samples; and the plurality of transform units are determined so that each transform unit of the plurality of transform units is included in any of the plurality of regions of 64 samples by 64 samples, wherein, the method further comprises:

performing first and second tests to determine whether a cu_skip_flag is to be decoded, the first test including determining whether a current slice type is an intra slice, and the second test including comparison between a fixed threshold and at least one of a width and a height of the coding unit; and determining that the cu_skip_flag is to be decoded in a case where the current slice type is not the intra slice, a predetermined prediction mode is enabled, and the width and the height of the coding unit are equal to or less than the fixed threshold, wherein, the second test is performed after the first test in a case where it is determined, in the first test, that the current slice type is not the intra slice.

2. The method according to claim 1, wherein at least one side of the coding unit is 128 samples.

3. A method for encoding a coding unit according to a predetermined manner, comprising:

determining the coding unit in a coding tree unit, determining a transform unit in the coding unit, and encoding the coding unit using the transform unit, wherein in the predetermined manner, a length of a side of the coding unit can be 128 samples, wherein, when a first constraint regarding a size of the transform unit is used to determine the transform unit, a maximum size selectable for luminance component of the transform unit in the coding unit is 32 samples which is one-fourth of 128 samples even if at least one side of the coding unit is 128 samples, wherein, a shape in which one side of a horizontal side and a vertical side is longer than other side is capable of being used as a shape of a transform unit in the predetermined manner, wherein the coding unit can be determined by dividing the coding tree unit using a ternary split, wherein a size of the coding tree unit is 128 samples by 128 samples, and wherein, when the coding unit spans a plurality of regions of 64 samples by 64 samples in the coding tree unit:

a first transform unit of a plurality of transform units in the coding unit is included in a first region of the plurality of regions of 64 samples by 64 samples;

a second transform unit, different from the first transform unit, of the plurality of transform units in the coding unit is included in a second region, different from the first region, of the plurality of regions of 64 samples by 64 samples; and the plurality of transform units are determined so that each transform unit of the plurality of transform units is included in any of the plurality of regions of 64 samples by 64 samples, wherein, the method further comprises:

performing first and second tests to determine whether a cu_skip_flag is to be encoded, the first test including determining whether a current slice type is an intra slice, and the second test including comparison between a fixed threshold and at least one of a width and a height of the coding unit; and determining that the cu_skip_flag is to be encoded in a case where the current slice type is not the intra slice, a predetermined prediction mode is enabled, and the width and the height of the coding unit are equal to or less than the fixed threshold, wherein, the second test is performed after the first test in a case where it is determined, in the first test, that the current slice type is not the intra slice.

4. The method according to claim 3, wherein at least one side of the coding unit is 128 samples.

5. An apparatus for decoding a coding unit from a bitstream according to a predetermined manner, comprising:

first decoding means for decoding information from the bitstream for determining the coding unit in a coding tree unit, first determining means for determining the coding unit based on the information, second determining means for determining a transform unit in the coding unit, and second decoding means for decoding the coding unit using the transform unit, wherein in the predetermined manner, a length of a side of the coding unit can be 128 samples, wherein, when a first constraint regarding a size of the transform unit is used to determine the transform unit, a maximum size selectable for luminance component of the transform unit in the coding unit is 32 samples which is one-fourth of 128 samples even if at least one side of the coding unit is 128 samples, wherein, a shape in which one side of a horizontal side and a vertical side is longer than other side is capable of being used as a shape of a transform unit in the predetermined manner, wherein the coding unit can be determined by dividing the coding tree unit using a ternary split, wherein a size of the coding tree unit is 128 samples by 128 samples, and wherein, when the coding unit spans a plurality of regions of 64 samples by 64 samples in the coding tree unit:

a first transform unit of a plurality of transform units in the coding unit is included in a first region of the plurality of regions of 64 samples by 64 samples;

a second transform unit, different from the first transform unit, of the plurality of transform units in the coding unit is included in a second region, different from the first region, of the plurality of regions of 64 samples by 64 samples; and the plurality of transform units are determined so that each transform unit of the plurality of transform units is included in any of the plurality of regions of 64 samples by 64 samples, performing means for performing first and second tests to determine whether a cu_skip_flag is to be decoded, the first test including determining whether a current slice type is an intra slice, and the second test including comparison between a fixed threshold and at least one of a width and a height of the coding unit; and determining means for determining that the cu_skip_flag is to be decoded in a case where the current slice type is not the intra slice, a predetermined prediction mode is enabled, and the width and the height of the coding unit are equal to or less than the fixed threshold, wherein, the second test is performed after the first test in a case where it is determined, in the first test, that the current slice type is not the intra slice.

6. An apparatus for encoding a coding unit according to a predetermined manner, comprising:

first determining means for determining the coding unit in a coding tree unit, second determining means for determining a transform unit in the coding unit, and encoding means for encoding the coding unit using the transform unit, wherein in the predetermined manner, a length of a side of the coding unit can be 128 samples, wherein, when a first constraint regarding a size of the transform unit is used to determine the transform unit, a maximum size selectable for luminance component of the transform unit in the coding unit is 32 samples which is one-fourth of 128 samples even if at least one side of the coding unit is 128 samples, wherein, a shape in which one side of a horizontal side and a vertical side is longer than other side is capable of being used as a shape of a transform unit in the predetermined manner, wherein the coding unit can be determined by dividing the coding tree unit using a ternary split, wherein a size of the coding tree unit is 128 samples by 128 samples, and wherein, when the coding unit spans a plurality of regions of 64 samples by 64 samples in the coding tree unit:

a first transform unit of a plurality of transform units in the coding unit is included in a first region of the plurality of regions of 64 samples by 64 samples;

a second transform unit, different from the first transform unit, of the plurality of transform units in the coding unit is included in a second region, different from the first region, of the plurality of regions of 64 samples by 64 samples; and the plurality of transform units are determined so that each transform unit of the plurality of transform units is included in any of the plurality of regions of 64 samples by 64 samples, performing means for performing first and second tests to determine whether a cu_skip_flag is to be encoded, the first test including determining whether a current slice type is an intra slice, and the second test including comparison between a fixed threshold and at least one of a width and a height of the coding unit; and determining means for determining that the cu_skip_flag is to be encoded in a case where the current slice type is not the intra slice, a predetermined prediction mode is enabled, and the width and the height of the coding unit are equal to or less than the fixed threshold, wherein, the second test is performed after the first test in a case where it is determined, in the first test, that the current slice type is not the intra slice.

7. A non-transitory computer-readable storage medium storing a program for causing a computer to execute an image decoding method for decoding a coding unit from a bitstream according to a predetermined manner, the method comprising:

decoding information from the bitstream for determining the coding unit in a coding tree unit, determining the coding unit based on the information, determining a transform unit in the coding unit, and decoding the coding unit using the transform unit, wherein in the predetermined manner, a length of a side of the coding unit can be 128 samples, wherein, when a first constraint regarding a size of the transform unit is used to determine the transform unit, a maximum size selectable for luminance component of the transform unit in the coding unit is 32 samples which is one-fourth of 128 samples even if at least one side of the coding unit is 128 samples, wherein, a shape in which one side of a horizontal side and a vertical side is longer than other side is capable of being used as a shape of a transform unit in the predetermined manner, wherein the coding unit can be determined by dividing the coding tree unit using a ternary split, wherein a size of the coding tree unit is 128 samples by 128 samples, and wherein, when the coding unit spans a plurality of regions of 64 samples by 64 samples in the coding tree unit:

a first transform unit of a plurality of transform units in the coding unit is included in a first region of the plurality of regions of 64 samples by 64 samples;

a second transform unit, different from the first transform unit, of the plurality of transform units in the coding unit is included in a second region, different from the first region, of the plurality of regions of 64 samples by 64 samples; and the plurality of transform units are determined so that each transform unit of the plurality of transform units is included in any of the plurality of regions of 64 samples by 64 samples, wherein, the method further comprises:

performing first and second tests to determine whether a cu_skip_flag is to be decoded, the first test including determining whether a current slice type is an intra slice, and the second test including comparison between a fixed threshold and at least one of a width and a height of the coding unit; and determining that the cu_skip_flag is to be decoded in a case where the current slice type is not the intra slice, a predetermined prediction mode is enabled, and the width and the height of the coding unit are equal to or less than the fixed threshold, wherein, the second test is performed after the first test in a case where it is determined, in the first test, that the current slice type is not the intra slice.

8. A non-transitory computer-readable storage medium storing a program for causing a computer to execute a method for encoding a coding unit according to a predetermined manner, the method comprising:

determining the coding unit in a coding tree unit, determining a transform unit in the coding unit, and encoding the coding unit using the transform unit, wherein in the predetermined manner, a length of a side of the coding unit can be 128 samples, wherein, when a first constraint regarding a size of the transform unit is used to determine the transform unit, a maximum size selectable for luminance component of the transform unit in the coding unit is 32 samples which is one-fourth of 128 samples even if at least one side of the coding unit is 128 samples, wherein, a shape in which one side of a horizontal side and a vertical side is longer than other side is capable of being used as a shape of a transform unit in the predetermined manner, wherein the coding unit can be determined by dividing the coding tree unit using a ternary split, wherein a size of the coding tree unit is 128 samples by 128 samples, and wherein, when the coding unit spans a plurality of regions of 64 samples by 64 samples in the coding tree unit:

a first transform unit of a plurality of transform units in the coding unit is included in a first region of the plurality of regions of 64 samples by 64 samples;

a second transform unit, different from the first transform unit, of the plurality of transform units in the coding unit is included in a second region, different from the first region, of the plurality of regions of 64 samples by 64 samples; and the plurality of transform units are determined so that each transform unit of the plurality of transform units is included in any of the plurality of regions of 64 samples by 64 samples, wherein, the method further comprises:

performing first and second tests to determine whether a cu_skip_flag is to be encoded, the first test including determining whether a current slice type is an intra slice, and the second test including comparison between a fixed threshold and at least one of a width and a height of the coding unit; and determining that the cu_skip_flag is to be encoded in a case where the current slice type is not the intra slice, a predetermined prediction mode is enabled, and the width and the height of the coding unit are equal to or less than the fixed threshold, wherein, the second test is performed after the first test in a case where it is determined, in the first test, that the current slice type is not the intra slice.

* * * * *